United States Patent
Elshafie et al.

(10) Patent No.: US 12,395,991 B2
(45) Date of Patent: Aug. 19, 2025

(54) SEMI-PERSISTENT RESOURCE RELEASE TIMING SIGNALING

(71) Applicant: QUALCOMM Incorporated, San Diego, CA (US)

(72) Inventors: Ahmed Elshafie, San Diego, CA (US); Yi Huang, San Diego, CA (US); Wei Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 17/508,330

(22) Filed: Oct. 22, 2021

(65) Prior Publication Data

US 2022/0141860 A1    May 5, 2022

Related U.S. Application Data

(60) Provisional application No. 63/107,428, filed on Oct. 29, 2020.

(51) Int. Cl.
*H04W 72/21* (2023.01)
*H04W 72/23* (2023.01)
*H04W 72/51* (2023.01)

(52) U.S. Cl.
CPC ........... *H04W 72/21* (2023.01); *H04W 72/23* (2023.01); *H04W 72/51* (2023.01)

(58) Field of Classification Search
CPC ..... H04W 72/21; H04W 72/23; H04W 72/51; H04W 76/38; H04W 76/36
See application file for complete search history.

(56) References Cited

U.S. PATENT DOCUMENTS 9,380,600 B2 * 6/2016 Lohr ................ H04L 1/1812
10,736,097 B2 * 8/2020 Belleschi .......... H04W 72/0446
(Continued)

FOREIGN PATENT DOCUMENTS

CN         113141657 A  * 7/2021 ........... H04L 5/0053
WO    WO-2009130543 A1 * 10/2009 ........... H04L 5/0053

OTHER PUBLICATIONS

Nokia et al. "On Enhanced UL Configured Grant Transmission for NR URLLC and activation/release of multiple SPS configurations", 3GPP Draft; R1-1908971_NR_URLLC_CONFIGUREDGRANTS_PRAGU E_FINAL, vol. RAN WG1, No. Prague, CZ; Aug. 16, 2019, pp. 1-7 (Year: 2019).*

(Continued)

*Primary Examiner* — Yuwen Pan
*Assistant Examiner* — Swati Jain
(74) *Attorney, Agent, or Firm* — Holland & Hart LLP

(57) ABSTRACT

Methods, systems, and devices for wireless communications are described. A user equipment (UE) may perform communications between the UE and a base station based at least in part on a set of semi-persistent resource occasions. The UE may receive a downlink control information releasing the set of semi-persistent resource occasions. The UE may determine a release time to release the set of semi-persistent resource occasions, wherein the release time for releasing the set of semi-persistent resource occasions is with respect to a receive time of the downlink control information. The UE may release the set of semi-persistent resource occasions at the release time based at least in part on the downlink control information.

30 Claims, 17 Drawing Sheets

(56) References Cited

U.S. PATENT DOCUMENTS

| | | | | |
|---|---|---|---|---|
| 10,973,078 | B2* | 4/2021 | Phuyal | H04W 76/28 |
| 11,452,164 | B2* | 9/2022 | Babaei | H04L 5/0044 |
| 11,652,578 | B2* | 5/2023 | Park | H04L 1/1819 |
| | | | | 370/329 |
| 11,751,207 | B2* | 9/2023 | Bagheri | H04W 72/535 |
| | | | | 370/329 |
| 2010/0202389 | A1* | 8/2010 | Cai | H04W 72/23 |
| | | | | 370/329 |
| 2018/0160445 | A1* | 6/2018 | Babaei | H04W 72/044 |
| 2018/0242326 | A1* | 8/2018 | Aiba | H04L 1/1848 |
| 2018/0279274 | A1* | 9/2018 | Sun | H04W 52/367 |
| 2018/0324889 | A1* | 11/2018 | Babaei | H04L 5/0057 |
| 2019/0222380 | A1* | 7/2019 | Manolakos | H04L 25/0224 |
| 2019/0363842 | A1* | 11/2019 | Fu | H04L 1/1896 |
| 2020/0163103 | A1* | 5/2020 | Kuang | H04W 72/23 |
| 2022/0045802 | A1* | 2/2022 | Park | H04L 1/1861 |
| 2022/0070857 | A1* | 3/2022 | Tsai | H04W 72/21 |
| 2022/0104202 | A1* | 3/2022 | Wu | H04W 72/53 |
| 2022/0132541 | A1* | 4/2022 | Kim | H04L 1/1812 |
| 2022/0159692 | A1* | 5/2022 | Lee | H04L 5/0053 |
| 2023/0180199 | A1* | 6/2023 | Jung | H04L 1/0038 |
| | | | | 370/329 |
| 2023/0199799 | A1* | 6/2023 | Wu | H04L 1/1812 |
| | | | | 370/329 |
| 2023/0412312 | A1* | 12/2023 | Wang | H04L 5/0055 |

OTHER PUBLICATIONS

Intel Corporation: "Remaining .issues on enhanced DL SPS for IIoT", 3GPP Draft; R1-2002003, vol. RAN WGI, Apr. 11, 2020, pp. 1-2, Retrieved from the Internet: URL:https://ftp.3gpp.org/tsg_ran/WG1_RL1/T SGR1_100b_e/Docs/R1-2002003.zi.p R1-2002003 Intel—IIoT DL SPS.docx (Year: 2020).*

Intel Corporation: "Remaining issues on enhanced DL SPS for IIoT"; 3GPP Draft, R1-2002003; Apr. 11, 2020 (Apr. 11, 2020) (Year: 2020).*

Takeda, K., Kishiyama, Y., Kawamura, T., & Nakamura, T. (2011). Investigation of PUCCH structure with SRS transmission based on BS-CDMA for LTE-advanced carrier aggregation (Year: 2011).*

Intel Corporation: "Remaining Issues on Enhanced DL SPS for IIoT", 3GPP Draft, R1-2002003, 3GPP TSG RAN WG1 Meeting #100bis-E, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875377, 5 Pages, Retrieved from the Internet: URL: https://ftp.3gpp.org/tsg_ran/WG1_RL1/TSGR1_100b_e/Docs/R1-2002003.zip, R1-2002003, Intel—IIoT DL SPS.docx [retrieved on Apr. 11, 2020] p. 1-p. 2.

International Search Report and Written Opinion—PCT/US2021/072009—ISA/EPO—Feb. 9, 2022.

Nokia, et al., "On Enhanced UL Configured Grant Transmission for NR URLLC and Activation/Release of Multiple SPS Configurations", 3GPP Draft, 3GPP TSG RAN WG1 Meeting #98, R1-1908971_NR_URLLC_ConfiguredGrant_Prague_Final, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), pp. 1-7, XP051765576, Retrieved from the Internet: URL: http://www.3gpp.org/ftp/tsg_ran/WG1_RL1/TSGR1_98/Docs/R1-1908971.zip [Retrieved on Aug. 16, 2019] p. 5, paragraph 2.4.

* cited by examiner

SEMI-PERSISTENT RESOURCE RELEASE TIMING SIGNALING

CROSS REFERENCE

The present application for patent claims the benefit of U.S. Provisional Patent Application No. 63/107,428 by ELSHAFIE et al., entitled "SEMI-PERSISTENT RESOURCE RELEASE TIMING SIGNALING," filed Oct. 29, 2020, assigned to the assignee hereof, and expressly incorporated by reference herein.

FIELD OF TECHNOLOGY

The following relates to wireless communications, including semi-persistent resource release timing signaling.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support semi-persistent resource release timing signaling. Generally, the described techniques provide various mechanisms to provide an indication of a release time for semi-persistent resource occasions. For example, a base station may transmit an indication of a release timing for the user equipment (UE) to release the configured resources (e.g., the semi-persistent resource occasions). The indication may be conveyed in the releasing downlink control information (DCI). The releasing DCI may indicate a Kc value associated with the release time (e.g., Kc may correspond to the release time and/or to an offset value at the symbol, mini-slot, and/or slot level with respect to the releasing DCI). Available Kc values (e.g., one or more tables indicating available release times) may be configured for the UE via radio resource control (RRC) configuration signaling configuring the semi-persistent resources and/or using other RRC/medium access control (MAC) control element (CE) signaling. The UE may receive the indication of the release time in the releasing DCI and determine the release time based on the indication and the timing of the releasing DCI (e.g., based on the final symbol of the releasing DCI). Accordingly, the UE may release the configured resources at the release time. The UE may, or may not, monitor resource occasions and/or provide feedback message signaling for resource occasions at least partially overlapping with the release time, depending upon which option is adopted.

A method for wireless communication at a UE is described. The method may include performing communications between the UE and a base station based on a set of semi-persistent resource occasions, receiving a DCI releasing the set of semi-persistent resource occasions, determining a release time to release the set of semi-persistent resource occasions, where the release time for releasing the set of semi-persistent resource occasions is with respect to a receive time of the DCI, and releasing the set of semi-persistent resource occasions at the release time based on the DCI.

An apparatus for wireless communication at a UE is described. The apparatus may include a processor, memory coupled with the processor, and instructions stored in the memory. The instructions may be executable by the processor to cause the apparatus to perform communications between the UE and a base station based on a set of semi-persistent resource occasions, receive a DCI releasing the set of semi-persistent resource occasions, determine a release time to release the set of semi-persistent resource occasions, where the release time for releasing the set of semi-persistent resource occasions is with respect to a receive time of the DCI, and release the set of semi-persistent resource occasions at the release time based on the DCI.

Another apparatus for wireless communication at a UE is described. The apparatus may include means for performing communications between the UE and a base station based on a set of semi-persistent resource occasions, means for receiving a DCI releasing the set of semi-persistent resource occasions, means for determining a release time to release the set of semi-persistent resource occasions, where the release time for releasing the set of semi-persistent resource occasions is with respect to a receive time of the DCI, and means for releasing the set of semi-persistent resource occasions at the release time based on the DCI.

A non-transitory computer-readable medium storing code for wireless communication at a UE is described. The code may include instructions executable by a processor to perform communications between the UE and a base station based on a set of semi-persistent resource occasions, receive a DCI releasing the set of semi-persistent resource occasions, determine a release time to release the set of semi-persistent resource occasions, where the release time for releasing the set of semi-persistent resource occasions is with respect to a receive time of the DCI, and release the set of semi-persistent resource occasions at the release time based on the DCI.

In some examples of the method, apparatuses, and non-transitory computer-readable medium described herein, determining the release time may include operations, features, means, or instructions for receiving an indication of the release time in the DCI.

Some examples of the method, apparatuses, and non-transitory computer-readable medium described herein may further include operations, features, means, or instructions for receiving a configuration signal including an indication of one or more tables associated with available release times, where determining the release time may be based on the configuration signal and the DCI.

In some examples of the method, apparatuses, and non-transitory computer-readable medium described herein, the configuration signal includes at least one of a first RRC configuration signal configuring the set of semi-persistent resource occasions, a second RRC configuration signal separate from the first RRC configuration signal, a MAC CE, or a combination thereof.

Some examples of the method, apparatuses, and non-transitory computer-readable medium described herein may further include operations, features, means, or instructions for identifying, based on the communications and the DCI, one or more semi-persistent resource occasions that occur between receiving the DCI and the release time and performing, based on the identifying, the communications between the UE and the base station during the one or more semi-persistent resource occasions.

Some examples of the method, apparatuses, and non-transitory computer-readable medium described herein may further include operations, features, means, or instructions for identifying, based on the communications and the DCI, one or more semi-persistent resource occasions that begin before the release time and end after the release time and performing, based on the identifying, the communications between the UE and the base station during the one or more semi-persistent resource occasions.

In some examples of the method, apparatuses, and non-transitory computer-readable medium described herein, performing the communications may include operations, features, means, or instructions for transmitting a feedback message associated with the communications between the UE and the base station during the one or more semi-persistent resource occasions and based on the release time, the feedback message indicating acknowledgement information for the one or more semi-persistent resource occasions.

Some examples of the method, apparatuses, and non-transitory computer-readable medium described herein may further include operations, features, means, or instructions for identifying, based on the communications and the DCI, one or more semi-persistent resource occasions that begin before the release time and end after the release time and refraining from performing, based on the identifying, the communications between the UE and the base station during the one or more semi-persistent resource occasions.

In some examples of the method, apparatuses, and non-transitory computer-readable medium described herein, refraining from performing the communications may include operations, features, means, or instructions for discarding communications performed during the one or more semi-persistent resource occasions and refraining from transmitting a feedback message associated with a discarded communications between the UE and the base station during the one or more semi-persistent resource occasions and based on the release time, the feedback message indicating acknowledgement information for the one or more semi-persistent resource occasions.

Some examples of the method, apparatuses, and non-transitory computer-readable medium described herein may further include operations, features, means, or instructions for identifying, based on the communications and the DCI, one or more semi-persistent resource occasions that begin at or after the release time and refraining from performing, based on the identifying, the communications between the UE and the base station during the one or more semi-persistent resource occasions.

Some examples of the method, apparatuses, and non-transitory computer-readable medium described herein may further include operations, features, means, or instructions for transmitting a feedback message associated with the communications between the UE and the base station based on the release time, the feedback message indicating acknowledgement information for one or more semi-persistent resource occasions of the set of semi-persistent resource occasions that may be selected based on the release time and the DCI.

In some examples of the method, apparatuses, and non-transitory computer-readable medium described herein, determining the release time may include operations, features, means, or instructions for determining a last symbol associated with the DCI and determining the release time based on the last symbol associated with the DCI and the DCI.

Some examples of the method, apparatuses, and non-transitory computer-readable medium described herein may further include operations, features, means, or instructions for transmitting a UE capability message indicating a UE processing time associated with the UE processing the DCI, where the release time may be based on the UE processing time.

In some examples of the method, apparatuses, and non-transitory computer-readable medium described herein, the release time may be based on at least one of a symbol offset, a mini-slot offset, a slot offset, or a combination thereof, between the DCI and the release time.

In some examples of the method, apparatuses, and non-transitory computer-readable medium described herein, the set of semi-persistent resource occasions include downlink semi-persistent scheduling (SPS) resource occasions, uplink configured grant (CG) resource occasions, or both.

A method for wireless communication at a base station is described. The method may include performing communications between the base station and a UE based on a set of semi-persistent resource occasions, determining a release time for the UE to release the set of semi-persistent resource occasions, where the release time for the UE releasing the set of semi-persistent resource occasions is with respect to a receive time of a DCI, and transmitting the DCI releasing the set of semi-persistent resource occasions, where the set of semi-persistent resource occasions are released at the UE at the release time based on the DCI.

An apparatus for wireless communication at a base station is described. The apparatus may include a processor, memory coupled with the processor, and instructions stored in the memory. The instructions may be executable by the processor to cause the apparatus to perform communications between the base station and a UE based on a set of semi-persistent resource occasions, determine a release time for the UE to release the set of semi-persistent resource occasions, where the release time for the UE releasing the set of semi-persistent resource occasions is with respect to a receive time of a DCI, and transmit the DCI releasing the set of semi-persistent resource occasions, where the set of semi-persistent resource occasions are released at the UE at the release time based on the DCI.

Another apparatus for wireless communication at a base station is described. The apparatus may include means for performing communications between the base station and a UE based on a set of semi-persistent resource occasions, means for determining a release time for the UE to release the set of semi-persistent resource occasions, where the release time for the UE releasing the set of semi-persistent resource occasions is with respect to a receive time of a DCI, and means for transmitting the DCI releasing the set of semi-persistent resource occasions, where the set of semi-persistent resource occasions are released at the UE at the release time based on the DCI.

A non-transitory computer-readable medium storing code for wireless communication at a base station is described. The code may include instructions executable by a processor to perform communications between the base station and a UE based on a set of semi-persistent resource occasions, determine a release time for the UE to release the set of semi-persistent resource occasions, where the release time for the UE releasing the set of semi-persistent resource occasions is with respect to a receive time of a DCI, and transmit the DCI releasing the set of semi-persistent resource occasions, where the set of semi-persistent resource occasions are released at the UE at the release time based on the DCI.

Some examples of the method, apparatuses, and non-transitory computer-readable medium described herein may further include operations, features, means, or instructions for transmitting an indication of the release time in the DCI.

Some examples of the method, apparatuses, and non-transitory computer-readable medium described herein may further include operations, features, means, or instructions for transmitting a configuration signal including an indication of one or more tables associated with available release times, where the release time may be based on the configuration signal and the DCI.

In some examples of the method, apparatuses, and non-transitory computer-readable medium described herein, the configuration signal includes at least one of a first RRC configuration signal configuring the set of semi-persistent resource occasions, a second RRC configuration signal separate from the first RRC configuration signal, a MAC CE, or a combination thereof.

Some examples of the method, apparatuses, and non-transitory computer-readable medium described herein may further include operations, features, means, or instructions for identifying, based on the communications and the DCI, one or more semi-persistent resource occasions that occur between receiving the DCI and the release time and performing, based on the identifying, the communications between the base station and the UE during the one or more semi-persistent resource occasions.

Some examples of the method, apparatuses, and non-transitory computer-readable medium described herein may further include operations, features, means, or instructions for identifying, based on the communications and the DCI, one or more semi-persistent resource occasions that begin before the release time and end after the release time and performing, based on the identifying, the communications between the base station and the UE during the one or more semi-persistent resource occasions.

In some examples of the method, apparatuses, and non-transitory computer-readable medium described herein, performing the communications may include operations, features, means, or instructions for receiving a feedback message associated with the communications between the base station and the UE during the one or more semi-persistent resource occasions and based on the release time, the feedback message indicating acknowledgement information for the one or more semi-persistent resource occasions.

Some examples of the method, apparatuses, and non-transitory computer-readable medium described herein may further include operations, features, means, or instructions for identifying, based on the communications and the DCI, one or more semi-persistent resource occasions that begin before the release time and end after the release time and refraining from performing, based on the identifying, the communications between the base station and the UE during the one or more semi-persistent resource occasions.

In some examples of the method, apparatuses, and non-transitory computer-readable medium described herein, refraining from performing the communications may include operations, features, means, or instructions for refraining from receiving a feedback message associated with a discarded communications between the UE and the base station during the one or more semi-persistent resource occasions and based on the release time, the feedback message indicating acknowledgement information for the one or more semi-persistent resource occasions.

Some examples of the method, apparatuses, and non-transitory computer-readable medium described herein may further include operations, features, means, or instructions for identifying, based on the communications and the DCI, one or more semi-persistent resource occasions that begin at or after the release time and refraining from performing, based on the identifying, the communications between the base station and the UE during the one or more semi-persistent resource occasions.

Some examples of the method, apparatuses, and non-transitory computer-readable medium described herein may further include operations, features, means, or instructions for receiving a feedback message associated with the communications between the base station and the UE based on the release time, the feedback message indicating acknowledgement information for one or more semi-persistent resource occasions of the set of semi-persistent resource occasions that may be selected based on the release time and the DCI.

In some examples of the method, apparatuses, and non-transitory computer-readable medium described herein, determining the release time may include operations, features, means, or instructions for determining a last symbol associated with the DCI and determining the release time based on the last symbol associated with the DCI and the DCI.

Some examples of the method, apparatuses, and non-transitory computer-readable medium described herein may further include operations, features, means, or instructions for receiving a UE capability message indicating a UE processing time associated with the UE processing the DCI, where the release time may be based on the UE processing time.

In some examples of the method, apparatuses, and non-transitory computer-readable medium described herein, the release time may be based on at least one of a symbol offset, a mini-slot offset, a slot offset, or a combination thereof, between the DCI and the release time.

In some examples of the method, apparatuses, and non-transitory computer-readable medium described herein, the set of semi-persistent resource occasions include downlink SPS resource occasions, uplink CG resource occasions, or both.

DETAILED DESCRIPTION

Some wireless communication systems may use semi-persistent resources (e.g., semi-persistent resource occasions) for communications in the downlink (e.g., semi-persistent scheduling (SPS) resources) and/or uplink (e.g., configured grant (CG) resources). Such resources are typically radio resource control (RRC) configured for a user equipment (UE) by the base station. The base station then transmits an activation downlink control information (DCI) to activate the configured resources, optionally transmits a reactivation DCI to reconfigure the resources, and then a releasing DCI to release the configured semi-persistent resources. However, wireless communications do not define any aspect of timing of the release of the configured semi-persistent resources after the UE receives the releasing DCI.

Aspects of the disclosure are initially described in the context of wireless communication systems. Generally, the described techniques provide various mechanisms to provide an indication of a release time for semi-persistent resource occasions. For example, a base station may transmit an indication of a release timing for the UE to release the configured resources (e.g., the semi-persistent resource occasions). The indication may be conveyed in the releasing DCI. The releasing DCI may indicate a Kc value associated with the release time (e.g., Kc may correspond to the release time and/or to an offset value at the symbol, mini-slot, and/or slot level with respect to the releasing DCI). Available Kc values (e.g., one or more tables indicating available release times) may be configured for the UE via RRC configuration signaling configuring the semi-persistent resources and/or using other RRC/medium access control (MAC) control element (CE) signaling. The UE may receive the indication of the release time in the releasing DCI and determine the release time based on the indication and the timing of the releasing DCI (e.g., based on the final symbol of the releasing DCI). Accordingly, the UE may release the configured resources at the release time. The UE may, or may not, monitor resource occasions and/or provide feedback message signaling for resource occasions at least partially overlapping with the release time, depending upon which option is adopted.

Aspects of the disclosure are further illustrated by and described with reference to apparatus diagrams, system diagrams, and flowcharts that relate to semi-persistent resource release timing signaling.

Figure 1:
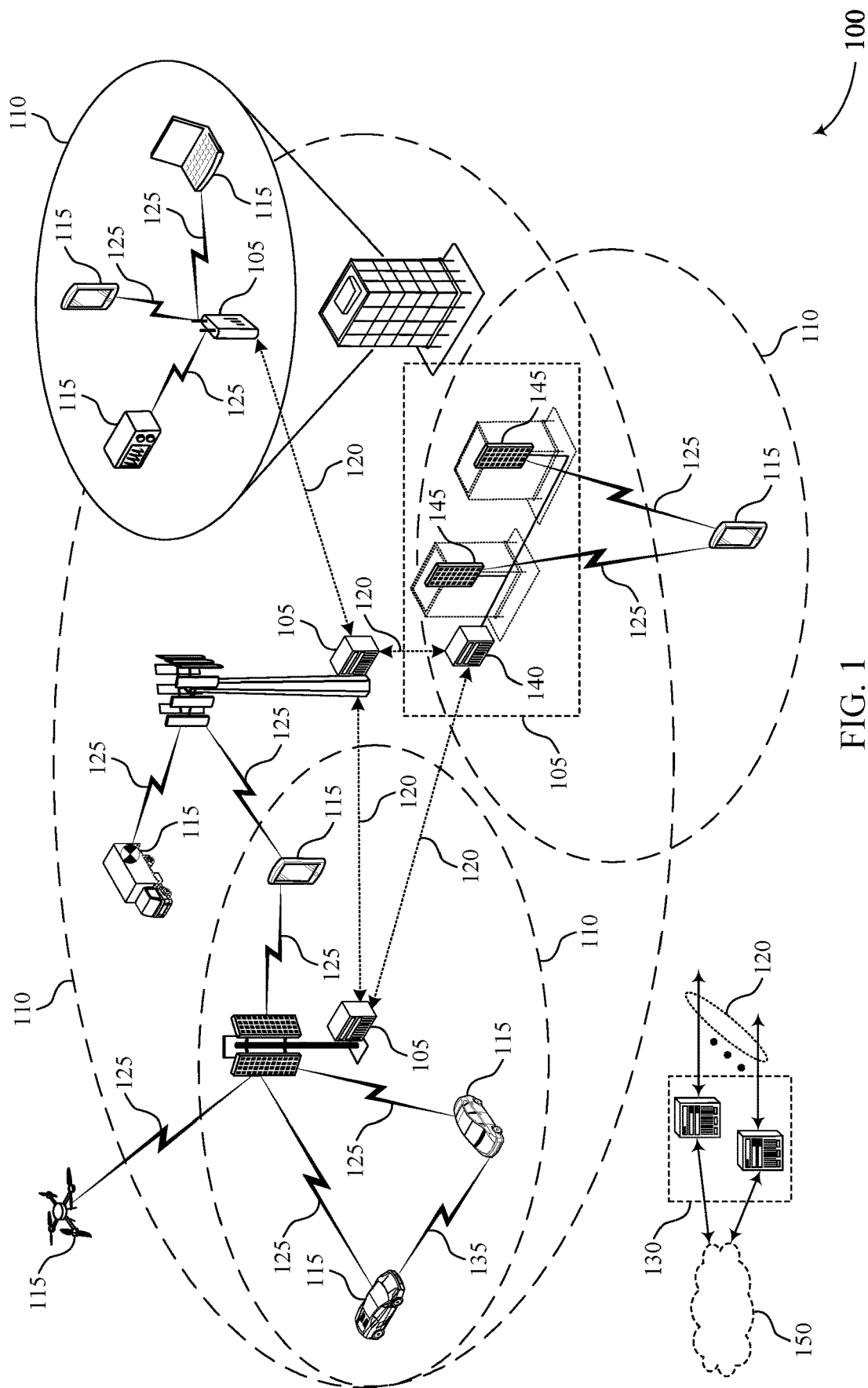
FIG. 1 illustrates an example of a wireless communication system that supports semi-persistent resource release timing signaling in accordance with aspects of the present disclosure.

FIG. 1 illustrates an example of a wireless communication system 100 that supports semi-persistent resource release timing signaling in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may perform communications between the UE 115 and a base station 105 based at least in part on a set of semi-persistent resource occasions. The UE 115 may receive a DCI releasing the set of semi-persistent resource occasions. The UE 115 may determine a release time to release the set of semi-persistent resource occasions, wherein the release time for releasing the set of semi-persistent resource occasions is with respect to a receive time of the DCI. The UE 115 may release the set of semi-persistent resource occasions at the release time based at least in part on the DCI.

A base station 105 may perform communications between the base station 105 and a UE 115 based at least in part on a set of semi-persistent resource occasions. The base station 105 may determine a release time for the UE 115 to release the set of semi-persistent resource occasions, wherein the release time for the UE 115 releasing the set of semi-persistent resource occasions is with respect to a receive time of a DCI. The base station 105 may transmit the DCI releasing the set of semi-persistent resource occasions, wherein the set of semi-persistent resource occasions are released by the UE 115 at the release time based at least in part on the DCI.

Figure 2:
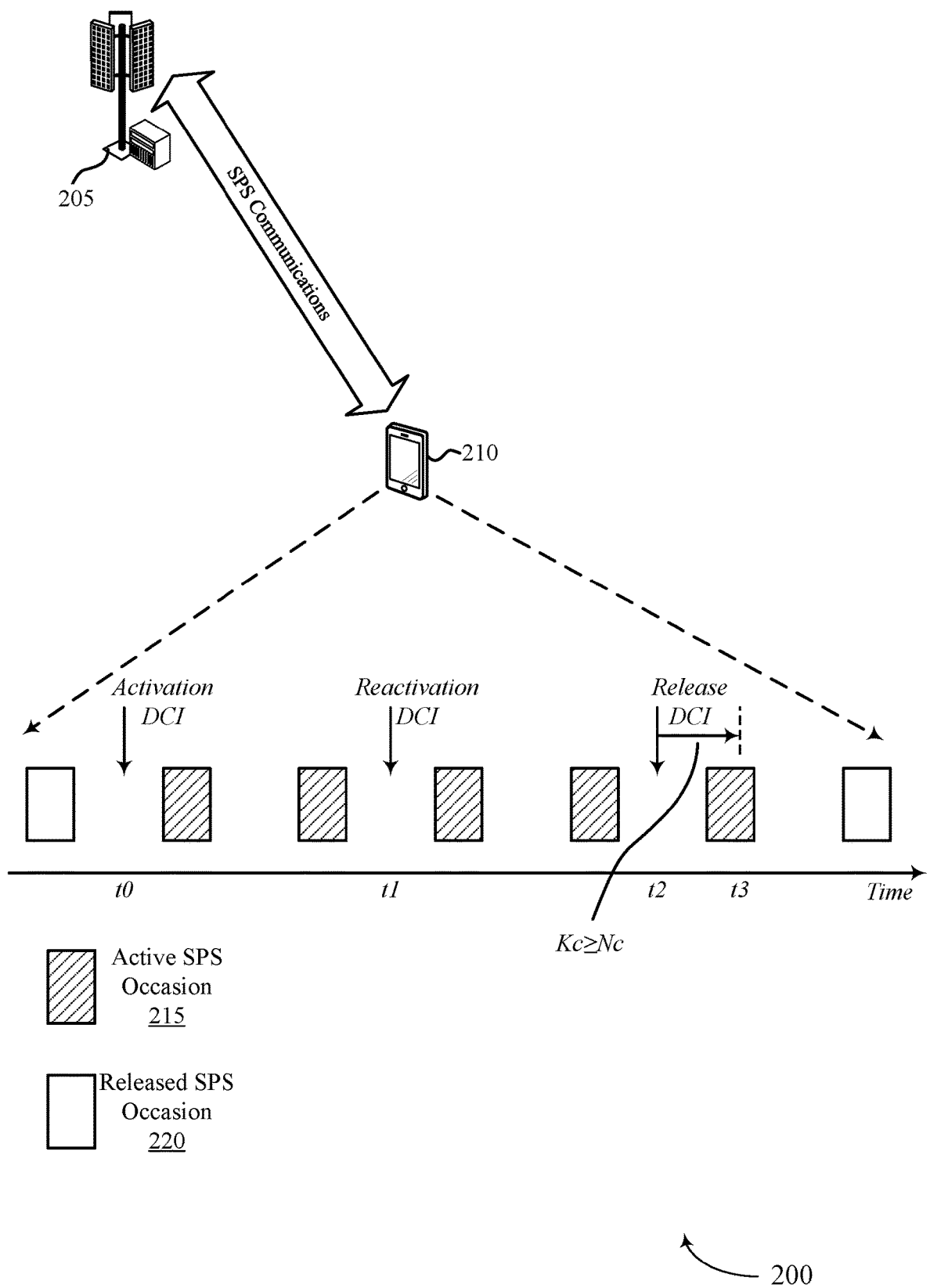
FIG. 2 illustrates an example of a wireless communication system that supports semi-persistent resource release timing signaling in accordance with aspects of the present disclosure.

FIG. 2 illustrates an example of a wireless communication system 200 that supports semi-persistent resource release timing signaling in accordance with aspects of the present disclosure. Wireless communication system 200 may include base station 205 and/or UE 210, which may be examples of the corresponding devices described herein.

Wireless communication system 200 may use configured semi-persistent resources (e.g., semi-persistent resource occasions) for communications in the downlink (e.g., SPS resources) and/or uplink (e.g., CG resources). Such resources are typically RRC configured for UE 210 by base station 205. Base station 205 may then transmit an activation DCI to activate the configured resources, optionally transmit a reactivation DCI to reconfigure the resources, and then a releasing DCI to release the configured semi-persistent resources.

That is, base station 205 may transmit or otherwise provide (and UE 210 may receive or otherwise obtain) configuration signaling (e.g., RRC configuration signaling) that configures the semi-persistent resource occasions (e.g., SPS and/or CG resource occasions, which may also be referred to as SPS configurations and/or CG configurations). For example, the configuration signaling may configure the frequency resources, spatial domain resources, code resources, periodicity associated with the resources, provide an indication of HARQ-ACK feedback resources to be used for the semi-persistent resource occasions, and the like.

Base station 205 may, e.g., at time t0, transmit a semi-persistent resource occasion activation DCI to activate certain configured semi-persistent resource occasions (e.g., at least some of the configured semi-persistent resource occasions, which may also be referred to as active SPS occasions 215 in the downlink example). The activation DCI may carry or otherwise convey an indication of various transmission parameters to be used for communications using the activated semi-persistent resource occasions. For example, the activation DCI may carry or otherwise convey an indication of a modulation and coding scheme (MCS), resource block allocation, antenna ports (e.g., spatial information), and the like, to be used for communications between base station 205 and UE 210 using the activated semi-persistent resource occasions. Accordingly, base station 205 and UE 210 may perform communications based at least in part on some of the configured semi-persistent resource occasions (e.g., may perform communications during the active SPS occasions 215) in response to the activation DCI.

If needed, base station 205 may transmit or otherwise provide (and UE 210 may receive or otherwise obtain) a reactivation DCI (e.g., also referred to as an SPS reactivation DCI in the downlink example) to change one or more of the transmission parameters being used for communications in the active SPS occasions 215. For example, at time t1 base station 205 may transmit or otherwise provide (and UE 210 may receive or otherwise obtain) a reactivation DCI that changes the MCS, resource block allocation, antenna port configuration, and the like, for subsequent communications using the active SPS occasions 215.

Base station 205 may transmit or otherwise provide (and UE 210 may receive or otherwise obtain) a releasing DCI (e.g., also referred to as an SPS release DCI in the downlink example) to release a set of semi-persistent resource occasions (e.g., to release at least some of the configured semi-persistent resource occasions). For example, a time t2 base station 205 may transmit or otherwise provide (and UE 210 may receive or otherwise obtain) a DCI releasing the set of semi-persistent resource occasions. Broadly, UE 210 may release the set of semi-persistent resource occasions in response to the releasing DCI.

Some wireless communication systems may define a minimum time (Nc) for UE 210 to process the SPS release DCI. In some aspects, Nc may have different values depending on such considerations as a UE capability of UE 210, the subcarrier spacing (SCS) of the component carrier being used for the releasing DCI, the SCS of the SPS physical downlink shared channel (PDSCH) and released (e.g., the semi-persistent resource occasions being released by the releasing DCI), and the like. In some aspects, Nc may be defined in terms of a number of OFDM symbols, which may begin in the last symbol of the releasing DCI. However, the default Nc values are generic network configured default values and may or may not extend into a semi-persistent resource occasion overlapping with the release time.

Some wireless communication systems do not provide a mechanism to determine the release time for the semi-persistent resource allocations being released by the releasing DCI. That is, current wireless communication systems do not define a gap between UE 210 receiving the releasing DCI and an effective time when the semi-persistent resource occasions are released. This may result in ambiguity between base station 205 and UE 210 in terms of when the SPS resources are released (e.g., in the downlink example). For example, in some situations UE 210 may release the SPS PDSCH (e.g., the semi-persistent resource occasions) immediately after successfully receiving a decoding the SPS release DCI. As base station 205 may not fully understand the processing and response time of UE 210, there may be ambiguity with respect to when the semi-persistent resource occasions are released. This may result in the situation where UE 210 successfully receives and decodes the releasing DCI during a semi-persistent resource occasion being used for communications. Accordingly, the UE may release that semi-persistent resource occasion. This may further result in ambiguity and/or a missed communications between base station 205 and UE 210 with regards to HARQ-ACK feedback message signaling.

Accordingly, aspects of the described techniques provide various mechanisms to support UE behavior before, at or after Kc (e.g., at the symbol, mini-slot, and/or slot offset level) from the end of the SPS release DCI/PDCCH (e.g., from the last symbol of the releasing DCI). For example, the described techniques provide various mechanisms to define a time where the SPS release DCI is effective (e.g., the release time). In some aspects, the described techniques provide options where UE 210 may or may not stop monitoring the SPS PDSCH occasions (e.g., the semi-persistent resource occasions), and/or may or may not report HARQ-ACK feedback for those occasions, overlapping with the release time. Generally, Kc may correspond to the actual release time and/or information used to determine the release time (e.g., an offset value in the time domain). Accordingly, reference to release time and/or Kc may be used interchangeably.

For example, base station 205 and UE 210 may be performing communications based on a set of semi-persistent resource occasions. This may include UE 210 not monitoring released SPS occasions 220 (e.g., configured, but not activated semi-persistent resource occasions) since these resources have not been activated. At time to, base station 205 may transmit the activation DCI to UE 210 activating at least some of the configured semi-persistent resource occasions (e.g., creating active SPS occasions 215). The activation DCI may provide transmission parameters for communications between base station 205 and UE 210 (e.g., uplink communications and/or downlink communications) using the activated semi-persistent resource occasions (e.g., the active SPS occasions 215). As discussed, base station 205 may transmit or otherwise provide (and UE 210 may receive or otherwise obtain) a reactivation DCI at time t1 that reconfigures one or more transmission parameters for the configured semi-persistent resource occasions. Base station 205 and UE 210 may continue to perform communications using the semi-persistent resource occasions (e.g., the active SPS occasions 215) according to the reconfigured transmission parameters.

Base station 205 may transmit or otherwise provide (and UE 210 may receive or otherwise obtain) a releasing DCI at time t2 that releases the set of semi-persistent resource occasions. For example, the releasing DCI may release one or more subsequent semi-persistent resource occasions. In some aspects, the releasing DCI may carry or otherwise convey an indication of the release time. Broadly, the release time may be measured from receiving the SPS release DCI (e.g., the last symbol of the DCI releasing semi-persistent resource occasions), which occurs at time t3 in the non-limiting example illustrated in wireless communication system 200. Generally, Kc may at least be equal to or greater than Nc and may correspond to a symbol offset, a mini-slot offset, and/or a slot offset between the last symbol of the releasing DCI and the effect of time at which the semi-persistent resource occasions are released. In some aspects, Kc may be indicated (explicitly and/or implicitly) in the releasing DCI. For example, Kc may be indicated in a time domain resource allocation (TDRA) resource allocation field conveyed in the releasing DCI. In one example, new TDRA tables may be defined for Kc (e.g., a table with fewer rows than is used for the PDSCH allocation list pdsch-AllocationList). In another example, the releasing DCI may leverage the K0 values in the TDRA configured tables (e.g., pdsch-AllocationList and the PDSCH-TimeDomainResourceAllocation). In this example, base station 205 may define the TDRA tables for UE 210 and ensure that the selected TDRA row index indicated in the releasing DCI selects a value for K0 (which would correspond to Kc in the releasing DCI) that is greater than or equal to Nc. Accordingly, the releasing DCI may include a TDRA indication that is used by UE 210 as Kc, which may provide information used to determine the release time.

In some aspects, values for Kc may be configured for UE 210 by base station 205. For example, base station 205 may transmit or otherwise provide (and UE 210 may receive or otherwise obtain) a configuration signal carrying or otherwise conveying an indication of one or more tables (e.g., tables corresponding to Kc values) associated with available release times (e.g., newly defined Kc tables). The configuration signaling may include RRC signaling, such as the RRC configuration signaling used to configure the set of semi-persistent resource occasions. In this configuration example, each semi-persistent resource occasion (e.g., SPS configuration) may have its own configured Kc table/value. In another example, separate or other RRC and/or MAC CE configuration signaling may be used to configure UE 210 with the Kc table(s). In this configuration example, some and/or all of the configured semi-persistent resource occasions (e.g., a group or all of the SPS configurations) may be configured with the same Kc value/table(s). As discussed, Kc may be at least equal to or greater than Nc.

Accordingly, UE 210 may determine the release time to release the set of semi-persistent resource occasions based on the releasing DCI. For example, the release time for releasing the set of semi-persistent resource occasions may be with respect to the receive time of the releasing DCI and the indication of the release time (e.g., the indication of Kc)

conveyed in the releasing DCI. For example, UE 210 may identify the last symbol of the releasing DCI and determine the release time based on the Kc indication. Accordingly, UE 210 may release the set of semi-persistent resource occasions at the release time (e.g., at time t3) based on the releasing DCI. That is, UE 210 and/or base station 205 may determine the release time based on the Kc indication conveyed in the releasing DCI that identifies the offset between the last symbol of the releasing DCI and the release time.

As discussed above, the Kc indication carried or otherwise conveyed in the releasing DCI may be based on the capability of UE 210. As Nc may be a default processing time configured by the network, in some aspects UE 210 may transmit or otherwise provide (and base station 205 may receive or otherwise obtain) a UE capability message indicating the processing time of UE 210. Generally, the processing time of UE 210 may correspond to a time that it takes UE 210 to process and respond to the releasing DCI. In this situation, base station 205 may select or otherwise determine a value for Kc to be conveyed in the releasing DCI based on the capability of UE 210 (e.g., based on the UE processing time indicated in the capability message).

In some situations, the release time may correspond to an overlapping semi-persistent resource occasion. As shown in FIG. 2, the release time (e.g., time t3) occurs at a time in which UE 210 and base station 205 are performing communications during a semi-persistent resource occasion (e.g., an SPS PDSCH occasion in the downlink example). In this situation, various options are provided for UE 210 to adopt.

One option may include base station 205 and UE 210 continuing to perform communications using one or more semi-persistent resource occasions occurring in an overlapping manner with respect to the release time. That is, a semi-persistent resource occasion that begins before the release time and ends after the release time may be considered overlapping with respect to the release time, as is shown in FIG. 2. In this situation where base station 205 and/or UE 210 identifies the one or more semi-persistent resource occasions overlapping with the release time, base station 205 and UE 210 may continue to perform communications during the overlapping semi-persistent resource occasion. That is, if the PDSCH occasion (e.g., an active SPS occasion 215) starts before the release time, but after receiving the releasing DCI, UE 210 and/or base station 205 (e.g., depending on whether the communications are uplink or downlink) may continue to monitor/decode that semi-persistent resource occasion. UE 210 (or base station 205 in the uplink example) may transmit or otherwise provide HARQ-ACK feedback for the overlapping semi-persistent resource occasion. Accordingly, UE 210 may transmit or otherwise provide (and base station 205 may receive or otherwise obtain) a feedback message associated with the communications occurring during the overlapping semi-persistent resource occasions. The feedback message may carry or otherwise convey acknowledgment information (e.g., HARQ-ACK feedback information) for the overlapping semi-persistent resource occasion. Accordingly, this option may include SPS occasions beginning from the end of the DCI OFDM symbol to the start of the PDSCH allocation of the SPS configuration after the Kc time offset from the releasing DCI.

In another option, this may include overlapping semi-persistent resource occasions not being used for communications between base station 205 and UE 210. Again, base station 205 and/or UE 210 may identify or otherwise determine that one or more of the semi-persistent resource occasions begin before the release time and end after the release time (e.g., overlap with the release time where the PDSCH is not fully received). In this option, base station 205 and/or UE 210 may refrain from performing communications during the one or more semi-persistent resource occasions. That is, UE 210 may discard communications performed during the one or more semi-persistent resource occasions. UE 210 may (or base station 205 in the uplink example) refrain from transmitting feedback information associated with the discarded communications. That is, this option may include SPS occasions from the end of the DCI OFDM symbol to the end of the PDSCH allocation of the SPS configuration after Kc time offset from the releasing DCI. This option may be beneficial in terms of HARQ-ACK because base station 205 may not be concerned with whether or not UE 210 continues to monitor the SPS PDSCH after it sends the SPS PDSCH release (e.g., the releasing DCI). Instead, base station 205 may only be concerned with UE 210 not including HARQ-ACK feedback for the SPS PDSCH in the HARQ-ACK codebook. Accordingly, this option may include, if the PDSCH is not finished, UE 210 may stop monitoring this PDSCH occasion and may not send its HARQ-ACK feedback for this PDSCH occasion.

In some aspects, a semi-persistent resource occasion (e.g., active SPS occasion 215) occurring between receiving the releasing DCI and the release time may continue to be used for performing communications between base station 205 and UE 210. For example, base station 205 and/or UE 210 may identify or otherwise determine that one or more of the semi-persistent resource occasions occur (e.g., are completed) between receiving the releasing DCI (e.g., the last symbol of the releasing DCI) and the release time (e.g., end before time t3). In this example, base station 205 and UE 210 may continue to use those one or more semi-persistent resource occasions. Accordingly, if the PDSCH occasion finishes before the release time, but after receiving the release DCI, UE 210 may continue to monitor this PDSCH occasion and send its HARQ-ACK feedback accordingly.

In some aspects, a semi-persistent resource occasion that begins at or after the release time may be released or otherwise discarded. Accordingly, base station 205 and UE 210 may release the semi-persistent resource occasion and therefore refrain from performing communications on those semi-persistent resource occasions. Accordingly, for any PDSCH occasion that did not start before the release time (e.g., released SPS occasion 220), UE 210 may not monitor/decode that PDSCH occasion and does not send its HARQ-ACK feedback.

Accordingly and depending on the timing of semi-persistent resource occasions with respect to the release time, UE 210 may transmit or otherwise provide (and base station 205 may receive or otherwise obtain) a feedback message (e.g., HARQ-ACK feedback) associated with the communications between base station 205 and UE 210. The feedback message may carry or otherwise convey an indication of acknowledgment information (e.g., acknowledgment or negative-acknowledgment) for one or more semi-persistent resource occasions selected based on the release time and the releasing DCI.

Figure 3A:
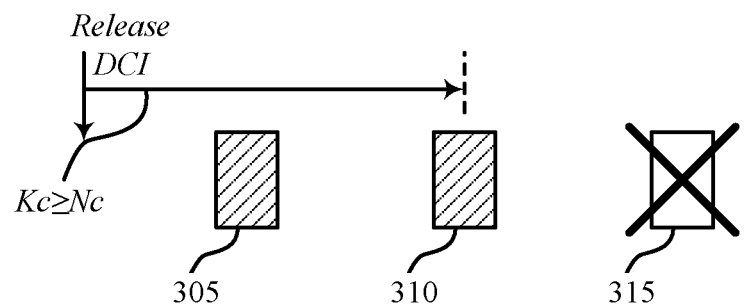
FIGS. 3A and 3B illustrate examples of a release time configuration that supports semi-persistent resource release timing signaling in accordance with aspects of the present disclosure.
Figure 3B:
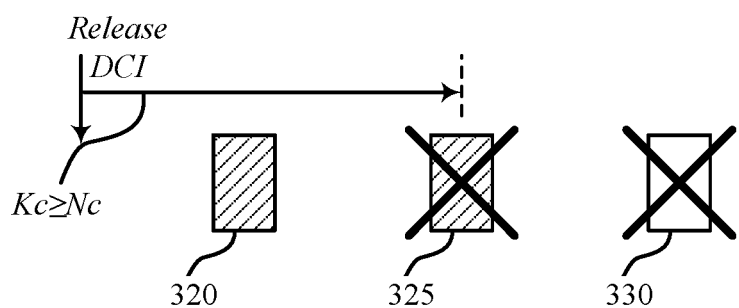

FIGS. 3A and 3B illustrate examples of a release time configuration 300 that supports semi-persistent resource release timing signaling in accordance with aspects of the present disclosure. Aspects of release time configuration 300 may be implemented by or implemented at wireless communication systems 100 and/or 200. Aspects of release time configuration 300 may be implemented by or at a base station and/or UE, which may be examples of the corresponding devices described herein. Broadly, release time configuration 300-*a* may correspond to an option where a semi-persistent resource allocation overlapping with the release time is used to perform communications between the base station and UE. Broadly, release time configuration 300-*b* may correspond to an option where a semi-persistent resource allocation overlapping with the release time is not used (e.g., discarded or otherwise released) to perform communications between the base station and UE.

As discussed above, aspects of the described techniques provide various mechanisms where the base station may provide an indication of a release time (e.g., Kc defining the offset between the last symbol of the releasing DCI and the actual release time) to a UE in the DCI releasing semi-persistent resource occasions (e.g., SPS resource occasions supporting SPS PDSCH communications and/or CG resource occasions supporting CG PUSCH communications). For example, the UE and base station may be performing communications based on semi-persistent resource occasions configured for the UE by the base station. For example, the base station may use RRC configuration signaling to configure various SPS and/or CG configurations for the UE. The base station may activate some of the semi-persistent resource occasions to use to perform communications between the base station and UE (e.g., uplink and/or downlink communications). The base station may activate some of the semi-persistent resource occasions by transmitting an activation DCI to the UE that provides various transmission parameters to be used for the communications using the semi-persistent resource occasions. Accordingly, the UE and base station may perform communication based on a set of semi-persistent resource occasions (e.g., active semi-persistent resource occasions). The base station may transmit or otherwise provide (and the UE may receive or otherwise obtain) a release DCI releasing a set of semi-persistent resource occasions. The releasing DCI may carry or otherwise convey an indication of the release time for the semi-persistent resource occasions (e.g., may indicate the Kc value in a TDRA field and/or Kc may be explicitly signaled in the releasing DCI using a new Kc field/bit). Accordingly, the UE may release the set of semi-persistent resource occasions at the release time based on the releasing DCI. As discussed above, in some examples this may result in one or more of the semi-persistent resource occasions overlapping with the release time (e.g., one or more of the semi-persistent resource occasions may begin before the release time and the end after the release time). FIGS. 3A and 3B illustrate two non-limiting options that may be adopted in this scenario.

Referring first to release time configuration 300-*a* of FIG. 3A, the base station may transmit or otherwise provide (and the UE may receive or otherwise obtain) the release DCI that carries or otherwise conveys the indication of the release time (e.g., the releasing DCI may include a TDRA field and/or a dedicated field indicating or otherwise corresponding to a Kc value), which is selected to be at least equal to or greater than Nc. The UE may use the indication in the releasing DCI to identify or otherwise determine the release time for a set of semi-persistent resource allocations.

In some situations, one or more (with one being shown by way of example only) semi-persistent resource occasions may occur between receiving the DCI and the release time (e.g., between the last symbol of the releasing DCI and the release time). In the non-limiting example illustrated in FIG. 3A, this may include semi-persistent resource occasion 305 occurring between receiving the releasing DCI and the release time. In this situation, the base station and UE may continue to perform communications during semi-persistent resource occasion 305. This may include UE continuing to monitor/decode semi-persistent resource occasion 305 and providing HARQ-ACK feedback for semi-persistent resource occasion 305.

In some situations, one or more (with one being shown by way of example only) semi-persistent resource occasions may overlap with the release time (e.g., may begin before the release time and end after the release time). In the non-limiting example illustrated in FIG. 3A, this may include semi-persistent resource occasion 310 beginning before the release time and ending after the release time. In this situation and according to one option, the base station and UE may continue to perform communications during semi-persistent resource occasion 310. This may include UE continuing to monitor/decode semi-persistent resource occasion 310 and providing HARQ-ACK feedback for semi-persistent resource occasion 310.

In some situations, one or more (with one being shown by way of example only) semi-persistent resource occasions may occur after the release time (e.g., may begin at or after the release time). In the non-limiting example illustrated in FIG. 3A, this may include semi-persistent resource occasion 315 beginning at or after the release time. In this situation, the base station and UE may discard or otherwise release semi-persistent resource occasion 315. That is, the base station and/or UE may refrain from performing communications during semi-persistent resource occasion 315. This may include UE discarding any monitored/decoded portions of semi-persistent resource occasion 315 and refraining from providing HARQ-ACK feedback for semi-persistent resource occasion 315.

Referring next to release time configuration 300-*b* of FIG. 3B, the base station may transmit or otherwise provide (and the UE may receive or otherwise obtain) the release DCI that carries or otherwise conveys the indication of the release time (e.g., the releasing DCI may include a TDRA field or a dedicated field indicating or otherwise corresponding to a Kc value, which is selected to be at least equal to or greater than Nc). The UE may use the indication in the releasing DCI to identify or otherwise determine the release time for a set of semi-persistent resource allocations.

In some situations, one or more (with one being shown by way of example only) semi-persistent resource occasions may occur between receiving the DCI and the release time (e.g., between the last symbol of the releasing DCI and the release time). In the non-limiting example illustrated in FIG. 3B, this may include semi-persistent resource occasion 320 occurring between receiving the releasing DCI and ending before the release time. In this situation, the base station and UE may continue to perform communications during semi-persistent resource occasion 320. This may include UE continuing to monitor/decode semi-persistent resource occasion 320 and providing HARQ-ACK feedback for semi-persistent resource occasion 320.

In some situations, one or more (with one being shown by way of example only) semi-persistent resource occasions may overlap with the release time (e.g., may begin before the release time and end after the release time). In the non-limiting example illustrated in FIG. 3B, this may include semi-persistent resource occasion 325 beginning before the release time and ending after the release time. In this situation and according to another option, this may include the base station and/or UE discarding or otherwise releasing semi-persistent resource occasion 325. That is, the base station and/or UE may refrain from performing communications during semi-persistent resource occasion 325. This may include the UE discarding any monitored/decoded portions of semi-persistent resource occasion 325 and refraining from providing HARQ-ACK feedback for semi-persistent resource occasion 325.

In some situations, one or more (with one being shown by way of example only) semi-persistent resource occasions may occur after the release time (e.g., may begin at or after the release time). In the non-limiting example illustrated in FIG. 3B, this may include semi-persistent resource occasion 330 beginning at or after the release time. In this situation, the base station and UE may discard or otherwise release semi-persistent resource occasion 330. That is, the base station and/or UE may refrain from performing communications during semi-persistent resource occasion 330. This may include UE discarding any monitored/decoded portions of semi-persistent resource occasion 330 and refraining from providing HARQ-ACK feedback for semi-persistent resource occasion 330.

Accordingly, release time configuration 300 illustrates two non-limiting options that may be adopted by the UE and/or base station when one or more semi-persistent resource occasions overlap with the release time determined based on the releasing DCI.

Figure 4:
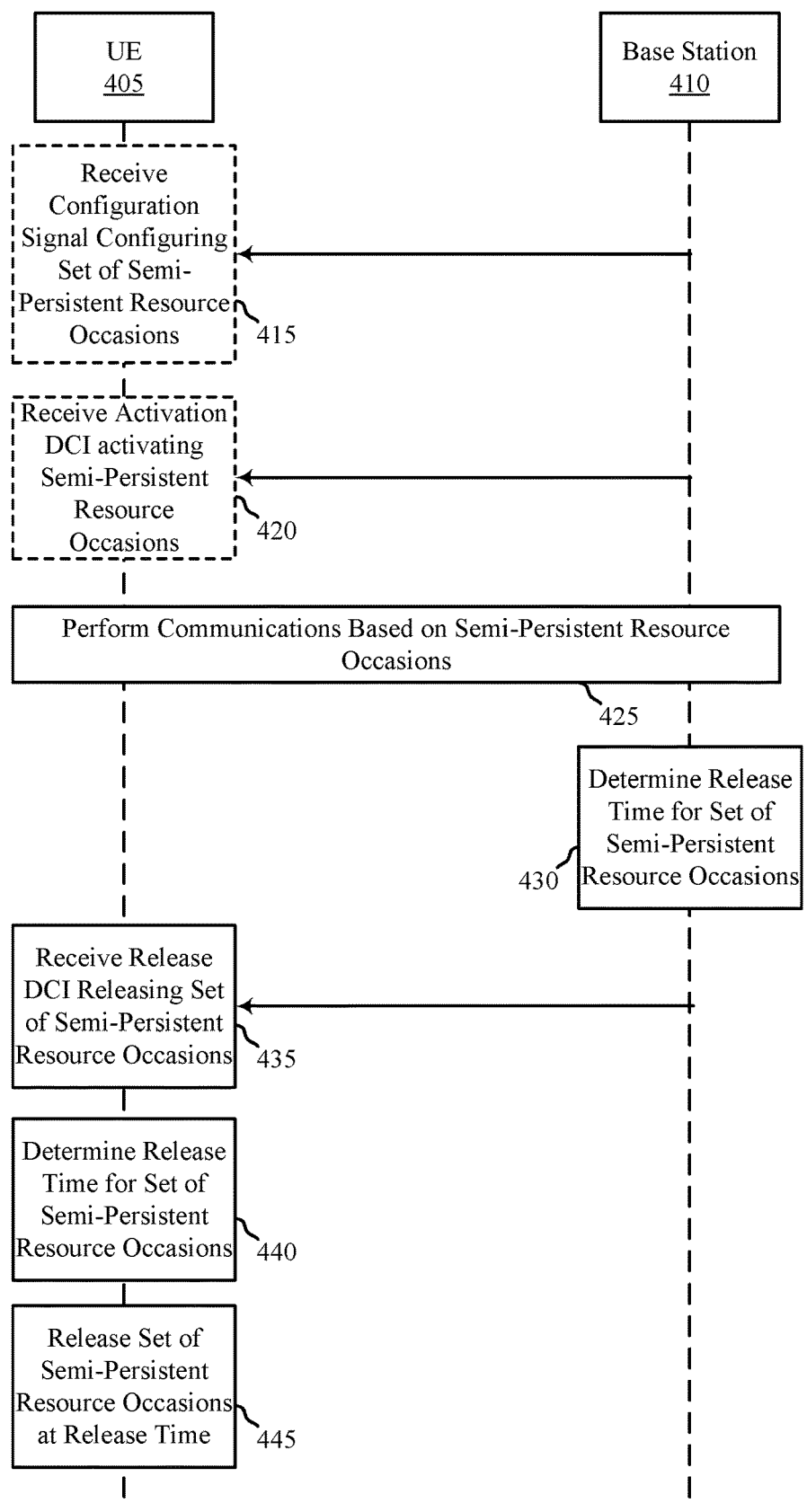
FIG. 4 illustrates an example of a process that supports semi-persistent resource release timing signaling in accordance with aspects of the present disclosure.

FIG. 4 illustrates an example of a process 400 that supports semi-persistent resource release timing signaling in accordance with aspects of the present disclosure. Aspects of process 400 may be implemented at or implemented by wireless communication systems 100 and/or 200, and/or release time configuration 300. Aspects of process 400 may be implemented by UE 405 and/or base station 410, which may be examples of the corresponding devices described herein.

At 415, base station 410 may optionally transmit or otherwise provide (and UE 405 may optionally receive or otherwise obtain) a configuration signal configuring semi-persistent resource occasions. The configuration signal may include RRC signaling configuring SPS and/or CG configurations to be used for downlink and/or uplink communications between UE 405 and base station 410, respectively. In some aspects, the configuration signal may carry or otherwise convey information identifying one or more tables associated with the available release times. For example, the configuration signal may indicate or otherwise identify one or more Kc tables to be used for the semi-persistent resource occasions, with each row in the Kc tables associated with a particular release time (e.g., Kc value). The Kc tables may correspond to newly defined and explicitly signaled Kc tables with one or more rows corresponding to different Kc values. In other aspects, different RRC configuration and/or MAC CE signaling may be used to configure UE 405 with the Kc tables.

At 420, base station 410 may optionally transmit or otherwise provide (and UE 405 may optionally receive or otherwise obtain) an activation DCI activating semi-persistent resource occasions. The activation DCI may carry or otherwise convey information identifying various transmission parameters to be used for communications performed using the activated semi-persistent resource occasions.

Accordingly and at 425, UE 405 and base station 410 may be performing communications based on the semi-persistent resource occasions. For example, the communications may include uplink communications and/or downlink communications using one or more configured and activated SPS occasions and/or CG occasions, respectively.

At 430, base station 410 may identify or otherwise determine a release time for UE 405 to release the set of semi-persistent resource occasions. The release time may be with respect to the receive time of a DCI releasing the semi-persistent resource occasions. For example, the release time may be an offset between the last symbol of the releasing DCI and the release time at the symbol level, mini-slot level, and/or slot level. In some aspects, the release time may be based on the network configured Nc value, e.g., base station 410 may ensure that the release time is at least equal to or greater than Nc. In some aspects, the release time may be based on the capability of UE 405. For example, UE 405 may transmit or otherwise provide a UE capability message to base station 410 indicating the processing time of UE 405. The processing time may correspond to the time in which it takes UE 405 to receive and decode the releasing DCI as well as to enact the release. Accordingly, base station 410 may identify, determine or otherwise select the release time for the semi-persistent resource occasion based on the UE capability, in some examples.

At 435, base station 410 may transmit or otherwise provide (and UE 405 may receive or otherwise obtain) a DCI releasing the set of semi-persistent resource occasions (e.g., the releasing DCI). In some aspects, the releasing DCI may carry or otherwise convey an indication of the release time. For example, the releasing DCI may include a TDRA value corresponding to a row in a TDRA table. The row in the TDRA table may correspond to a particular Kc value, which defines the offset between the last symbol of the releasing DCI and the release time. In another example, the releasing DCI may explicitly carry or otherwise convey a Kc field indicating the Kc value, e.g., similar to K1 fields carried in some DCIs.

Accordingly and at 440, UE 405 may identify or otherwise determine the release time to release the set of semi-persistent resource occasions, with the release time being with respect to the receive time (e.g., the last symbol) of the releasing DCI. For example, UE 405 may determine the last symbol associated with the releasing DCI and determine the release time based on the last symbol of the DCI in the DCI itself (e.g., the Kc value indicated in the DCI). In response and at 445, UE 405 may release the set of semi-persistent resource occasions at the release time according to the releasing DCI.

In some aspects, one or more of the semi-persistent resource occasions may occur between receiving the release DCI and the release time. In this situation, UE 405 and base station 410 may continue to perform communications during the semi-persistent resource occasions occurring between receiving the release DCI and the release time.

In some aspects, one or more of the semi-persistent resource occasions may begin at or after the release time. In this situation, UE 405 and base station 410 may refrain from performing communications during the semi-persistent resource occasions beginning at or after the release time. For example, UE 405 and/or base station 410 may discard any portions of the semi-persistent resource occasions monitored and/or decoded and/or may not provide HARQ-ACK feedback reporting for those semi-persistent resource occasions beginning at or after the release time.

In some aspects, one or more of the semi-persistent resource occasions may begin before the release time and the end after the release time (e.g., may overlap with the release time). In this situation, different options may be adopted with respect to the overlapping semi-persistent resource occasions. That is, different approaches may be adopted when UE 405 and/or base station 410 identify or otherwise determine that one or more of the semi-persistent resource occasions begin before the release time and end after the release time.

One option may include UE 405 and base station 410 continuing to perform communications during the one or more semi-persistent resource occasions that overlap with the release time. For example, UE 405 (in the downlink example) and/or base station 410 (in the uplink example) may continue to monitor/decode communications during the overlapping semi-persistent resource occasions and provide HARQ-ACK feedback reporting accordingly. For example, UE 405 (in the downlink example) may transmit or otherwise convey a feedback messaging including acknowledgment information for the overlapping semi-persistent resource occasions. In the uplink example, base station 410 may transmit or otherwise convey feedback messaging including acknowledgment information for the overlapping semi-persistent resource occasions.

Another option may include UE 405 and base station 410 refraining from performing communications during the one or more semi-persistent resource occasions that overlap with the release time. For example, UE 405 (in the downlink example) and/or base station 410 (in the uplink example) may discard or release any monitored/decoded communications during the overlapping semi-persistent resource occasions and may also refrain from providing HARQ-ACK feedback reporting accordingly.

Figure 5:
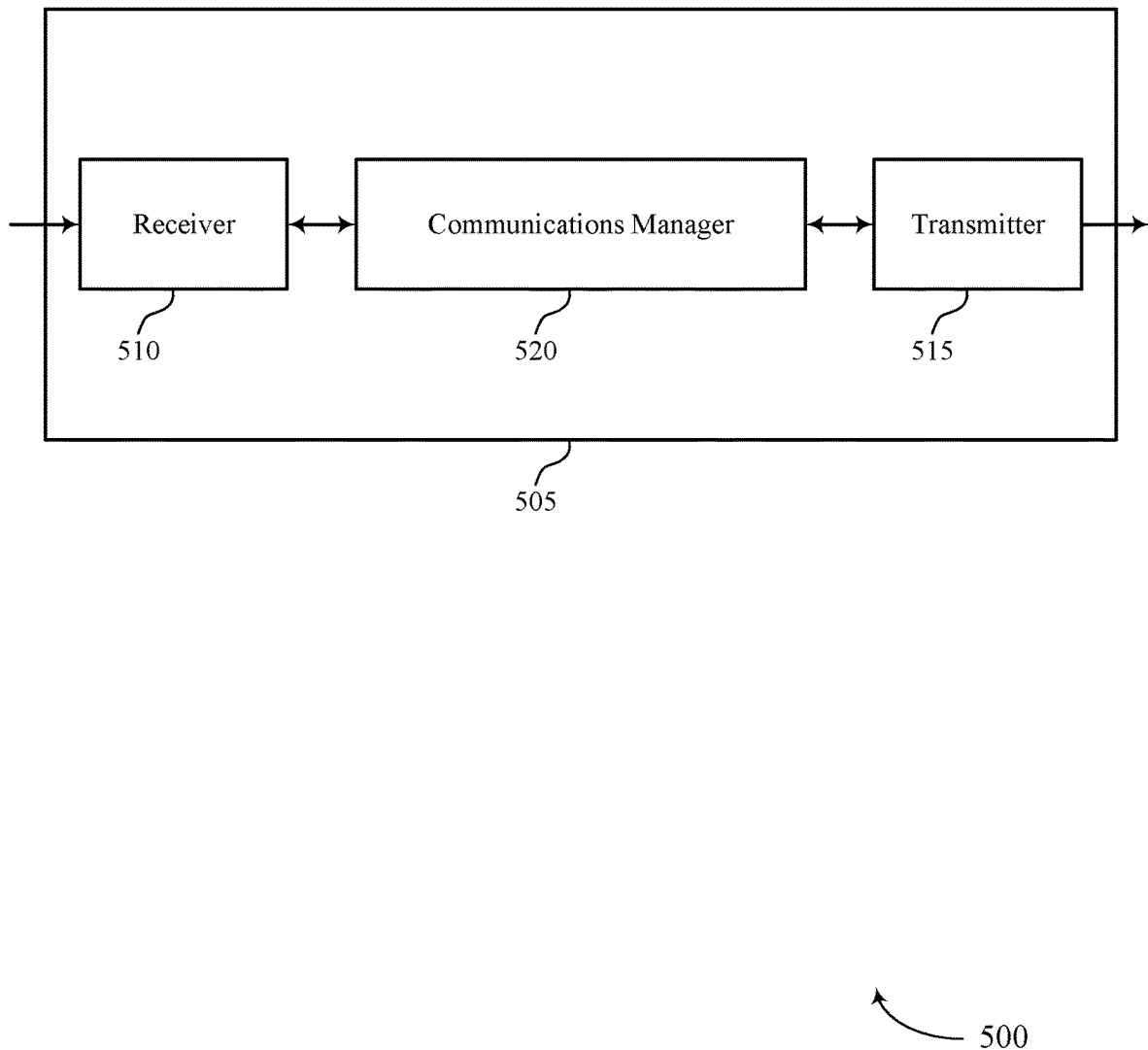
FIGS. 5 and 6 show block diagrams of devices that support semi-persistent resource release timing signaling in accordance with aspects of the present disclosure.

FIG. 5 shows a block diagram 500 of a device 505 that supports semi-persistent resource release timing signaling in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to semi-persistent resource release timing signaling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to semi-persistent resource release timing signaling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of semi-persistent resource release timing signaling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for performing communications between the UE and a base station based on a set of semi-persistent resource occasions. The communications manager 520 may be configured as or otherwise support a means for receiving a DCI releasing the set of semi-persistent resource occasions. The communications manager 520 may be configured as or otherwise support a means for determining a release time to release the set of semi-persistent resource occasions, where the release time for releasing the set of semi-persistent resource occasions is with respect to a receive time of the DCI. The communications manager 520 may be configured as or otherwise support a means for releasing the set of semi-persistent resource occasions at the release time based on the DCI.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing ambiguity between the base station and UE with respect to the time that the semi-persistent resource occasions are released. This may improve communications between the UE and base station as well as reduce system overhead, unnecessary retransmissions, and the like.

Figure 6:
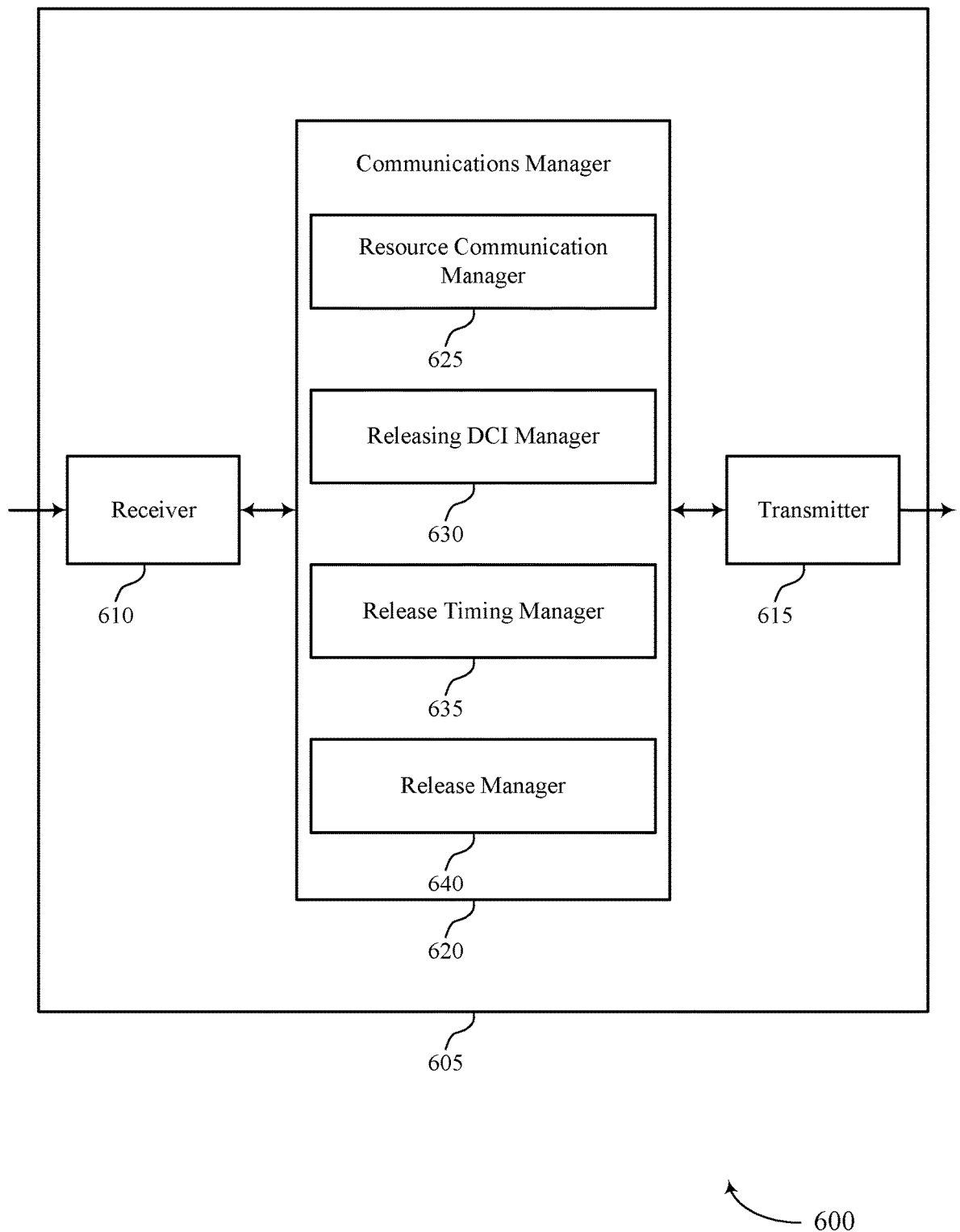

FIG. 6 shows a block diagram 600 of a device 605 that supports semi-persistent resource release timing signaling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to semi-persistent resource release timing signaling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to semi-persistent resource release timing signaling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of semi-persistent resource release timing signaling as described herein. For example, the communications manager 620 may include a resource communication manager 625, a releasing DCI manager 630, a release timing manager 635, a release manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The resource communication manager 625 may be configured as or otherwise support a means for performing communications between the UE and a base station based on a set of semi-persistent resource occasions. The releasing DCI manager 630 may be configured as or otherwise support a means for receiving a DCI releasing the set of semi-persistent resource occasions. The release timing manager 635 may be configured as or otherwise support a means for determining a release time to release the set of semi-persistent resource occasions, where the release time for releasing the set of semi-persistent resource occasions is with respect to a receive time of the DCI. The release manager 640 may be configured as or otherwise support a means for releasing the set of semi-persistent resource occasions at the release time based on the DCI.

Figure 7:
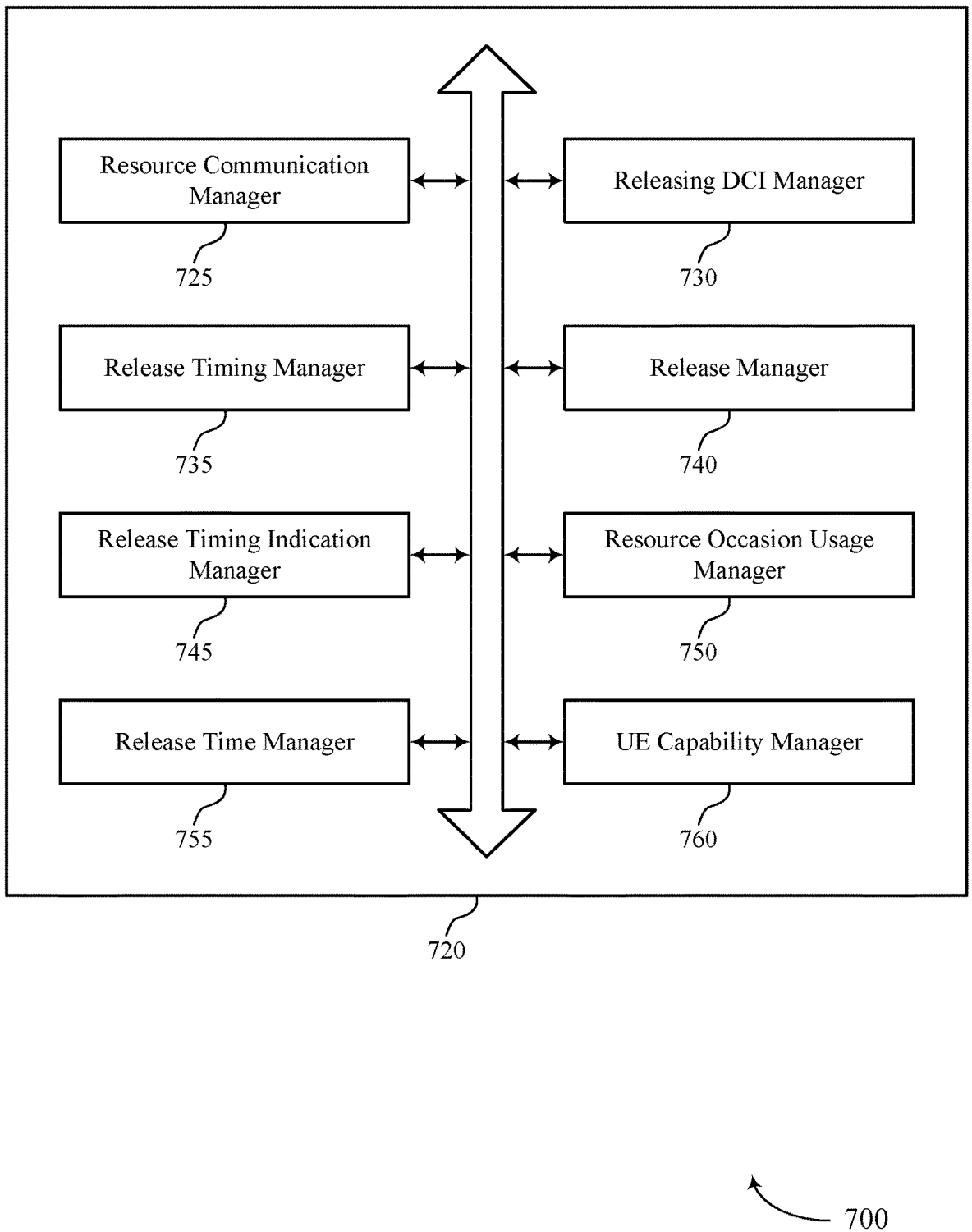
FIG. 7 shows a block diagram of a communications manager that supports semi-persistent resource release timing signaling in accordance with aspects of the present disclosure.

FIG. 7 shows a block diagram 700 of a communications manager 720 that supports semi-persistent resource release timing signaling in accordance with aspects of the present disclosure. The communications manager 720 may be an example of aspects of a communications manager 520, a communications manager 620, or both, as described herein. The communications manager 720, or various components thereof, may be an example of means for performing various aspects of semi-persistent resource release timing signaling as described herein. For example, the communications manager 720 may include a resource communication manager 725, a releasing DCI manager 730, a release timing manager 735, a release manager 740, a release timing indication manager 745, a resource occasion usage manager 750, a release time manager 755, a UE capability manager 760, or any combination thereof. Each of these components may communicate, directly or indirectly, with one another (e.g., via one or more buses).

The communications manager 720 may support wireless communication at a UE in accordance with examples as disclosed herein. The resource communication manager 725 may be configured as or otherwise support a means for performing communications between the UE and a base station based on a set of semi-persistent resource occasions. The releasing DCI manager 730 may be configured as or otherwise support a means for receiving a DCI releasing the set of semi-persistent resource occasions. The release timing manager 735 may be configured as or otherwise support a means for determining a release time to release the set of semi-persistent resource occasions, where the release time for releasing the set of semi-persistent resource occasions is with respect to a receive time of the DCI. The release manager 740 may be configured as or otherwise support a means for releasing the set of semi-persistent resource occasions at the release time based on the DCI.

In some examples, to support determining the release time, the release timing indication manager 745 may be configured as or otherwise support a means for receiving an indication of the release time in the DCI. In some examples, the release timing indication manager 745 may be configured as or otherwise support a means for receiving a configuration signal including an indication of one or more tables associated with available release times, where determining the release time is based on the configuration signal and the DCI. In some examples, the configuration signal includes at least one of a first RRC configuration signal configuring the set of semi-persistent resource occasions, a second RRC configuration signal separate from the first RRC configuration signal, a MAC CE, or a combination thereof.

In some examples, the resource occasion usage manager 750 may be configured as or otherwise support a means for identifying, based on the communications and the DCI, one or more semi-persistent resource occasions that occur between receiving the DCI and the release time. In some examples, the resource occasion usage manager 750 may be configured as or otherwise support a means for performing, based on the identifying, the communications between the UE and the base station during the one or more semi-persistent resource occasions. In some examples, the resource occasion usage manager 750 may be configured as or otherwise support a means for identifying, based on the communications and the DCI, one or more semi-persistent resource occasions that begin before the release time and end after the release time. In some examples, the resource occasion usage manager 750 may be configured as or otherwise support a means for performing, based on the identifying, the communications between the UE and the base station during the one or more semi-persistent resource occasions.

In some examples, to support performing the communications, the resource occasion usage manager 750 may be configured as or otherwise support a means for transmitting a feedback message associated with the communications between the UE and the base station during the one or more semi-persistent resource occasions and based on the release time, the feedback message indicating acknowledgement information for the one or more semi-persistent resource occasions. In some examples, the resource occasion usage manager 750 may be configured as or otherwise support a means for identifying, based on the communications and the DCI, one or more semi-persistent resource occasions that begin before the release time and end after the release time. In some examples, the resource occasion usage manager 750 may be configured as or otherwise support a means for refraining from performing, based on the identifying, the communications between the UE and the base station during the one or more semi-persistent resource occasions. In some examples, to support refraining from performing the communications, the resource occasion usage manager 750 may be configured as or otherwise support a means for discarding communications performed during the one or more semi-persistent resource occasions. In some examples, to support refraining from performing the communications, the resource occasion usage manager 750 may be configured as or otherwise support a means for refraining from transmitting a feedback message associated with a discarded communications between the UE and the base station during the one or more semi-persistent resource occasions and based on the release time, the feedback message indicating acknowledgement information for the one or more semi-persistent resource occasions.

In some examples, the resource occasion usage manager 750 may be configured as or otherwise support a means for identifying, based on the communications and the DCI, one or more semi-persistent resource occasions that begin at or after the release time. In some examples, the resource occasion usage manager 750 may be configured as or otherwise support a means for refraining from performing, based on the identifying, the communications between the UE and the base station during the one or more semi-persistent resource occasions. In some examples, the resource occasion usage manager 750 may be configured as or otherwise support a means for transmitting a feedback message associated with the communications between the UE and the base station based on the release time, the feedback message indicating acknowledgement information for one or more semi-persistent resource occasions of the set of semi-persistent resource occasions that are selected based on the release time and the DCI.

In some examples, to support determining the release time, the release time manager 755 may be configured as or otherwise support a means for determining a last symbol associated with the DCI. In some examples, to support determining the release time, the release time manager 755 may be configured as or otherwise support a means for determining the release time based on the last symbol associated with the DCI and the DCI.

In some examples, the UE capability manager 760 may be configured as or otherwise support a means for transmitting a UE capability message indicating a UE processing time associated with the UE processing the DCI, where the release time is based on the UE processing time.

In some examples, the release time is based on at least one of a symbol offset, a mini-slot offset, a slot offset, or a combination thereof, between the DCI and the release time. In some examples, the set of semi-persistent resource occasions include downlink SPS resource occasions, uplink CG resource occasions, or both.

Figure 8:
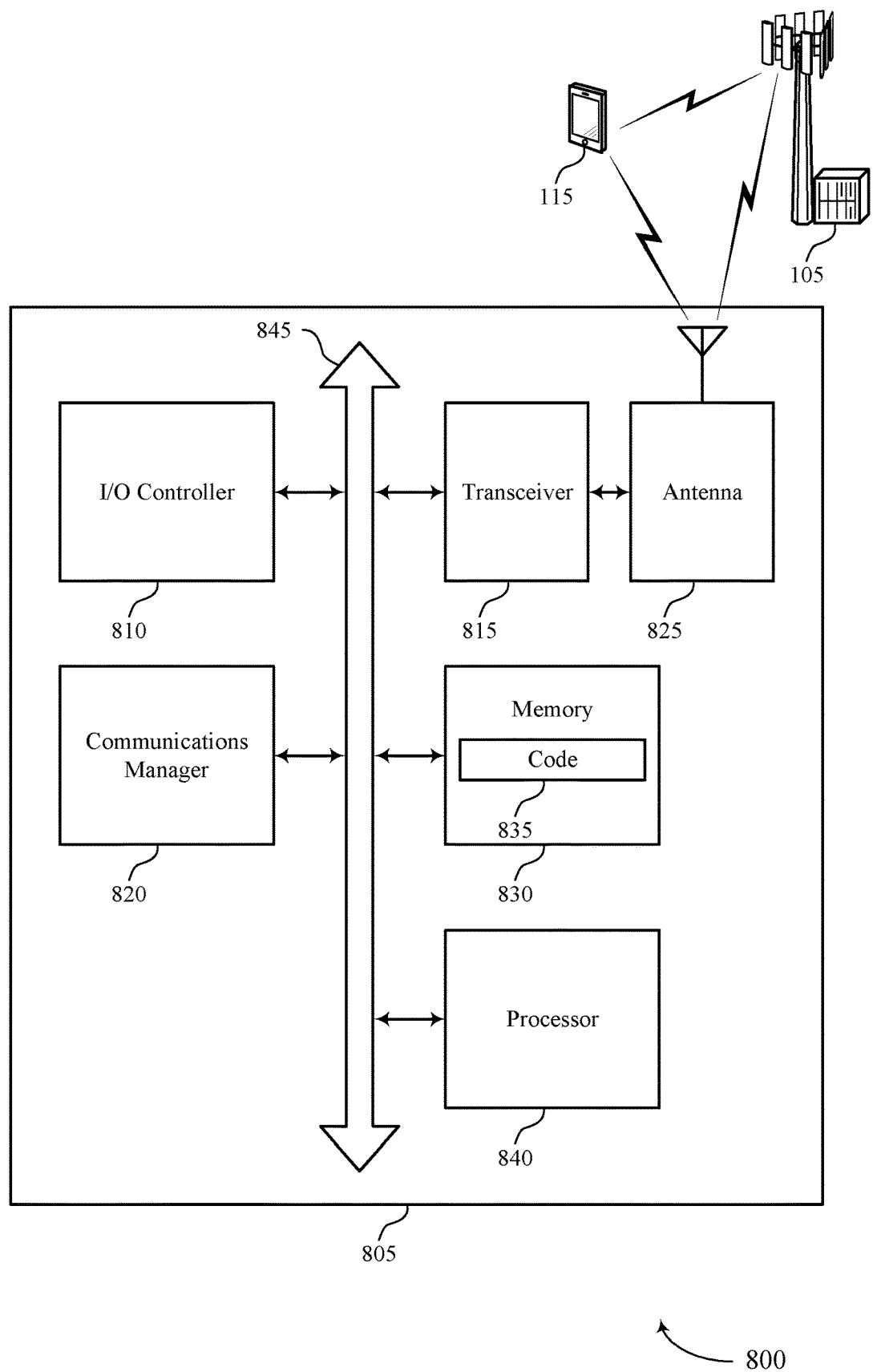
FIG. 8 shows a diagram of a system including a device that supports semi-persistent resource release timing signaling in accordance with aspects of the present disclosure.

FIG. 8 shows a diagram of a system 800 including a device 805 that supports semi-persistent resource release timing signaling in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting semi-persistent resource release timing signaling). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for performing communications between the UE and a base station based on a set of semi-persistent resource occasions. The communications manager 820 may be configured as or otherwise support a means for receiving a DCI releasing the set of semi-persistent resource occasions. The communications manager 820 may be configured as or otherwise support a means for determining a release time to release the set of semi-persistent resource occasions, where the release time for releasing the set of semi-persistent resource occasions is with respect to a receive time of the DCI. The communications manager 820 may be configured as or otherwise support a means for releasing the set of semi-persistent resource occasions at the release time based on the DCI.

By including or configuring the communications manager 820 in accordance with examples as described herein, the device 805 may support techniques for reducing ambiguity between the base station and UE with respect to the time that the semi-persistent resource occasions are released. This may improve communications between the UE and base station as well as reduce system overhead, unnecessary retransmissions, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of semi-persistent resource release timing signaling as described herein, or the processor 840 and the memory 830 may be otherwise configured to perform or support such operations.

Figure 9:
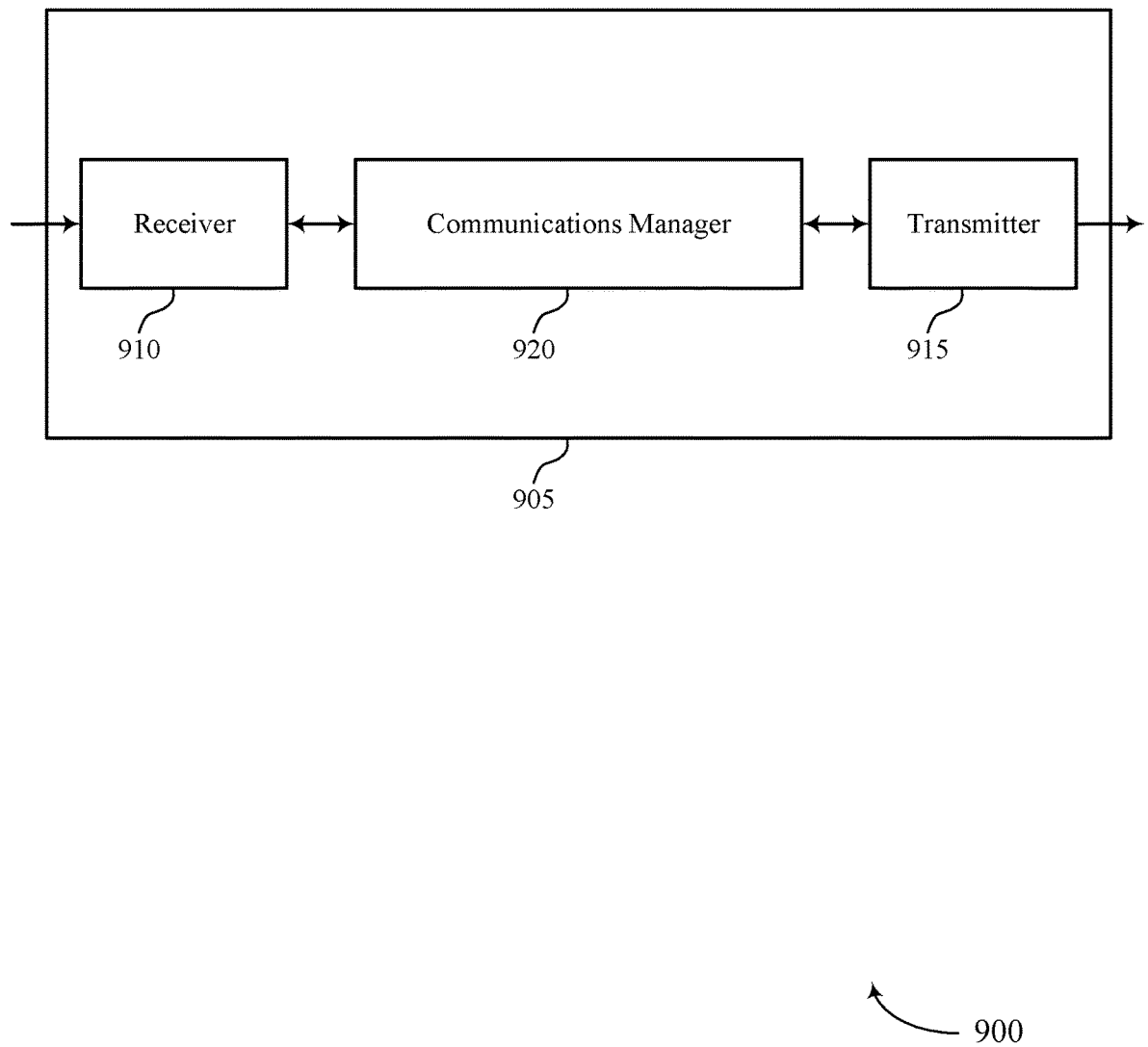
FIGS. 9 and 10 show block diagrams of devices that support semi-persistent resource release timing signaling in accordance with aspects of the present disclosure.

FIG. 9 shows a block diagram 900 of a device 905 that supports semi-persistent resource release timing signaling in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to semi-persistent resource release timing signaling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to semi-persistent resource release timing signaling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of semi-persistent resource release timing signaling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for performing communications between the base station and a UE based on a set of semi-persistent resource occasions. The communications manager 920 may be configured as or otherwise support a means for determining a release time for the UE to release the set of semi-persistent resource occasions, where the release time for the UE releasing the set of semi-persistent resource occasions is with respect to a receive time of a DCI. The communications manager 920 may be configured as or otherwise support a means for transmitting the DCI releasing the set of semi-persistent resource occasions, where the set of semi-persistent resource occasions are released at the UE at the release time based on the DCI.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improving power consumption by the UE, reducing overhead communications, and reducing ambiguity between the base station and UE with respect to HARQ-ACK feedback signaling.

Figure 10:
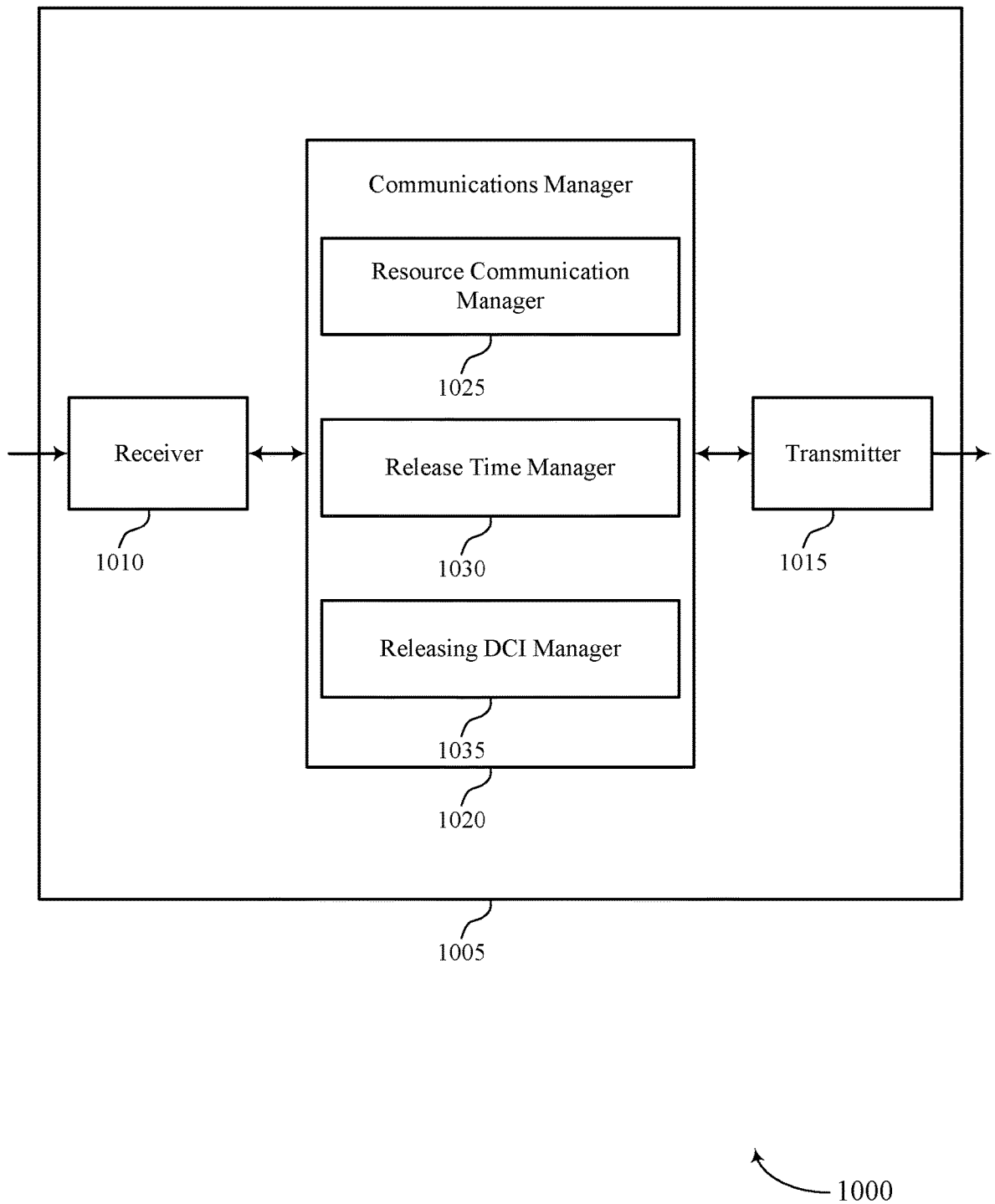

FIG. 10 shows a block diagram 1000 of a device 1005 that supports semi-persistent resource release timing signaling in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to semi-persistent resource release timing signaling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to semi-persistent resource release timing signaling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of semi-persistent resource release timing signaling as described herein. For example, the communications manager 1020 may include a resource communication manager 1025, a release time manager 1030, a releasing DCI manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The resource communication manager 1025 may be configured as or otherwise support a means for performing communications between the base station and a UE based on a set of semi-persistent resource occasions. The release time manager 1030 may be configured as or otherwise support a means for determining a release time for the UE to release the set of semi-persistent resource occasions, where the release time for the UE releasing the set of semi-persistent resource occasions is with respect to a receive time of a DCI. The releasing DCI manager 1035 may be configured as or otherwise support a means for transmitting the DCI releasing the set of semi-persistent resource occasions, where the set of semi-persistent resource occasions are released at the UE at the release time based on the DCI.

Figure 11:
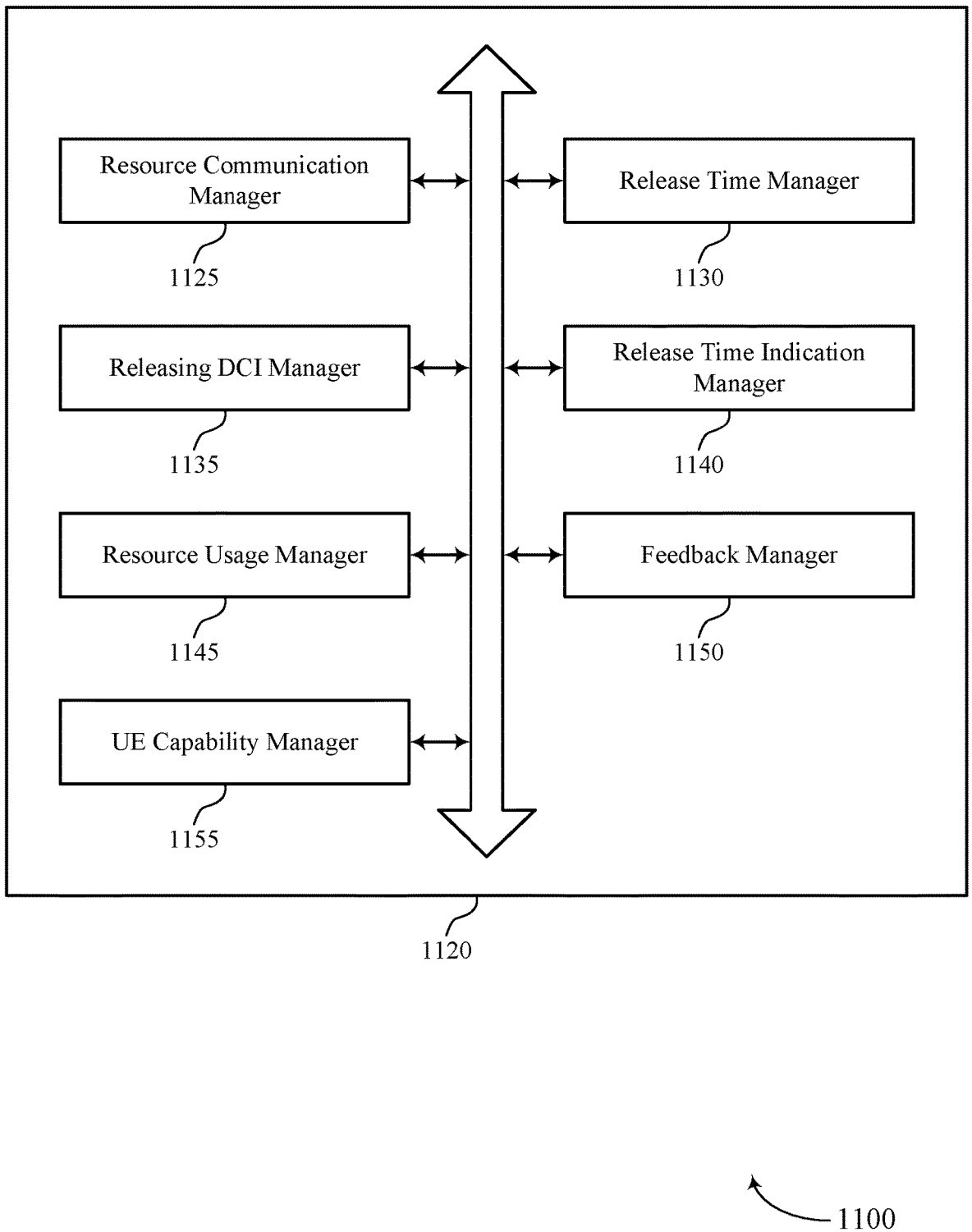
FIG. 11 shows a block diagram of a communications manager that supports semi-persistent resource release timing signaling in accordance with aspects of the present disclosure.

FIG. 11 shows a block diagram 1100 of a communications manager 1120 that supports semi-persistent resource release timing signaling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of semi-persistent resource release timing signaling as described herein. For example, the communications manager 1120 may include a resource communication manager 1125, a release time manager 1130, a releasing DCI manager 1135, a release time indication manager 1140, a resource usage manager 1145, a feedback manager 1150, a UE capability manager 1155, or any combination thereof. Each of these components may communicate, directly or indirectly, with one another (e.g., via one or more buses).

The communications manager 1120 may support wireless communication at a base station in accordance with examples as disclosed herein. The resource communication manager 1125 may be configured as or otherwise support a means for performing communications between the base station and a UE based on a set of semi-persistent resource occasions. The release time manager 1130 may be configured as or otherwise support a means for determining a release time for the UE to release the set of semi-persistent resource occasions, where the release time for the UE releasing the set of semi-persistent resource occasions is with respect to a receive time of a DCI. The releasing DCI manager 1135 may be configured as or otherwise support a means for transmitting the DCI releasing the set of semi-persistent resource occasions, where the set of semi-persistent resource occasions are released at the UE at the release time based on the DCI.

In some examples, the release time indication manager 1140 may be configured as or otherwise support a means for transmitting an indication of the release time in the DCI. In some examples, the release time indication manager 1140 may be configured as or otherwise support a means for transmitting a configuration signal including an indication of one or more tables associated with available release times, where the release time is based on the configuration signal and the DCI. In some examples, the configuration signal includes at least one of a first RRC configuration signal configuring the set of semi-persistent resource occasions, a second RRC configuration signal separate from the first RRC configuration signal, a MAC CE, or a combination thereof.

In some examples, the resource usage manager 1145 may be configured as or otherwise support a means for identifying, based on the communications and the DCI, one or more semi-persistent resource occasions that occur between receiving the DCI and the release time. In some examples, the resource usage manager 1145 may be configured as or otherwise support a means for performing, based on the identifying, the communications between the base station and the UE during the one or more semi-persistent resource occasions.

In some examples, the resource usage manager 1145 may be configured as or otherwise support a means for identifying, based on the communications and the DCI, one or more semi-persistent resource occasions that begin before the release time and end after the release time. In some examples, the resource usage manager 1145 may be configured as or otherwise support a means for performing, based on the identifying, the communications between the base station and the UE during the one or more semi-persistent resource occasions. In some examples, to support performing the communications, the resource usage manager 1145 may be configured as or otherwise support a means for receiving a feedback message associated with the communications between the base station and the UE during the one or more semi-persistent resource occasions and based on the release time, the feedback message indicating acknowledgement information for the one or more semi-persistent resource occasions.

In some examples, the resource usage manager 1145 may be configured as or otherwise support a means for identifying, based on the communications and the DCI, one or more semi-persistent resource occasions that begin before the release time and end after the release time. In some examples, the resource usage manager 1145 may be configured as or otherwise support a means for refraining from performing, based on the identifying, the communications between the base station and the UE during the one or more semi-persistent resource occasions.

In some examples, to support refraining from performing the communications, the resource usage manager 1145 may be configured as or otherwise support a means for refraining from receiving a feedback message associated with a discarded communications between the UE and the base station during the one or more semi-persistent resource occasions and based on the release time, the feedback message indicating acknowledgement information for the one or more semi-persistent resource occasions. In some examples, the resource usage manager 1145 may be configured as or otherwise support a means for identifying, based on the communications and the DCI, one or more semi-persistent resource occasions that begin at or after the release time. In some examples, the resource usage manager 1145 may be configured as or otherwise support a means for refraining from performing, based on the identifying, the communications between the base station and the UE during the one or more semi-persistent resource occasions.

In some examples, the feedback manager 1150 may be configured as or otherwise support a means for receiving a feedback message associated with the communications between the base station and the UE based on the release time, the feedback message indicating acknowledgement information for one or more semi-persistent resource occasions of the set of semi-persistent resource occasions that are selected based on the release time and the DCI.

In some examples, to support determining the release time, the release time manager 1130 may be configured as or otherwise support a means for determining a last symbol associated with the DCI. In some examples, to support determining the release time, the release time manager 1130 may be configured as or otherwise support a means for determining the release time based on the last symbol associated with the DCI and the DCI.

In some examples, the UE capability manager 1155 may be configured as or otherwise support a means for receiving a UE capability message indicating a UE processing time associated with the UE processing the DCI, where the release time is based on the UE processing time. In some examples, the release time is based on at least one of a symbol offset, a mini-slot offset, a slot offset, or a combination thereof, between the DCI and the release time. In some examples, the set of semi-persistent resource occasions include downlink SPS resource occasions, uplink CG resource occasions, or both.

Figure 12:
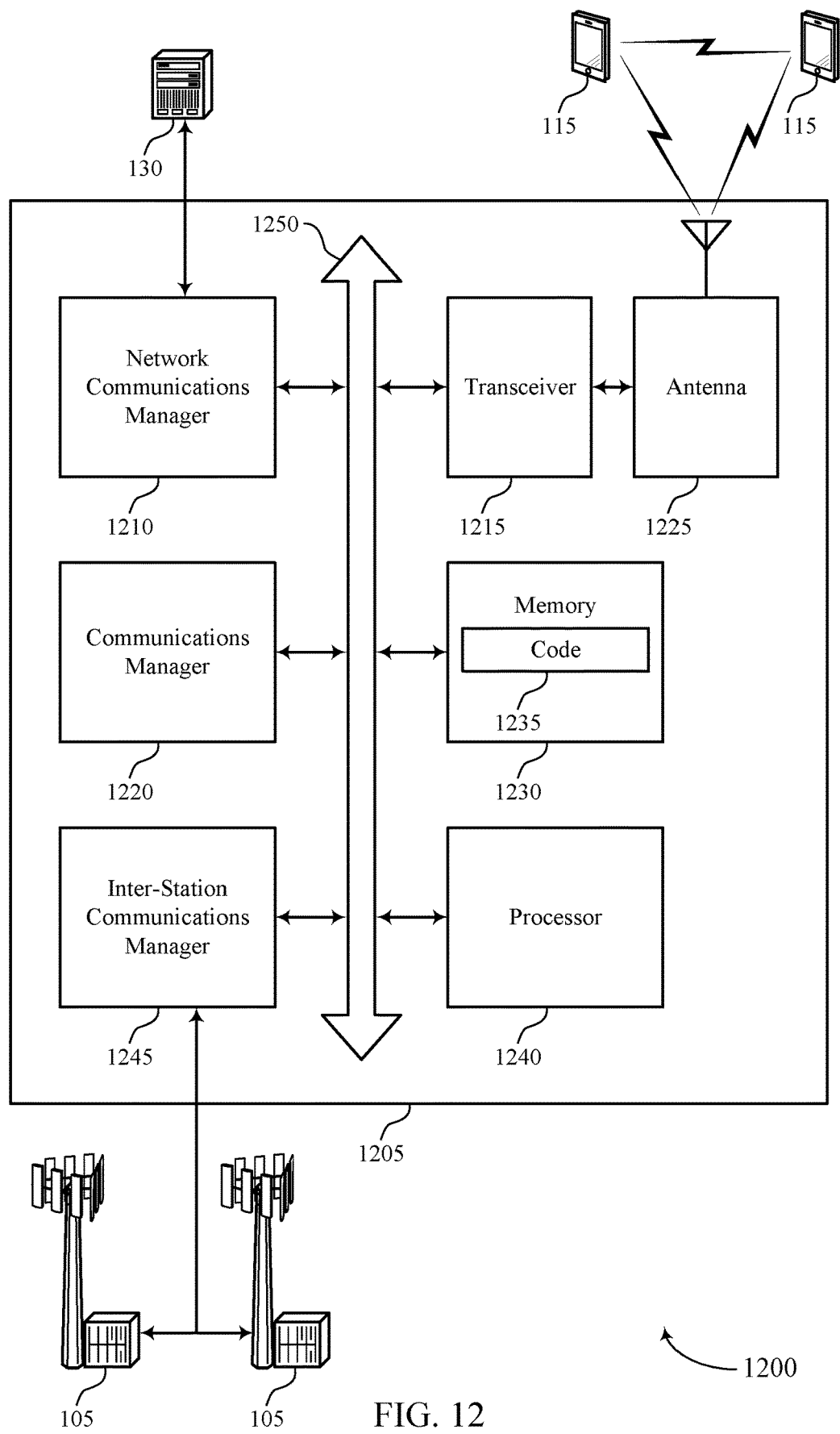
FIG. 12 shows a diagram of a system including a device that supports semi-persistent resource release timing signaling in accordance with aspects of the present disclosure.

FIG. 12 shows a diagram of a system 1200 including a device 1205 that supports semi-persistent resource release timing signaling in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting semi-persistent resource release timing signaling). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for performing communications between the base station and a UE based on a set of semi-persistent resource occasions. The communications manager 1220 may be configured as or otherwise support a means for determining a release time for the UE to release the set of semi-persistent resource occasions, where the release time for the UE releasing the set of semi-persistent resource occasions is with respect to a receive time of a DCI. The communications manager 1220 may be configured as or otherwise support a means for transmitting the DCI releasing the set of semi-persistent resource occasions, where the set of semi-persistent resource occasions are released at the UE at the release time based on the DCI.

By including or configuring the communications manager 1220 in accordance with examples as described herein, the device 1205 may support techniques for reducing ambiguity between the base station and UE with respect to the time that the semi-persistent resource occasions are released. This may improve communications between the UE and base station as well as reduce system overhead, unnecessary retransmissions, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of semi-persistent resource release timing signaling as described herein, or the processor 1240 and the memory 1230 may be otherwise configured to perform or support such operations.

Figure 13:
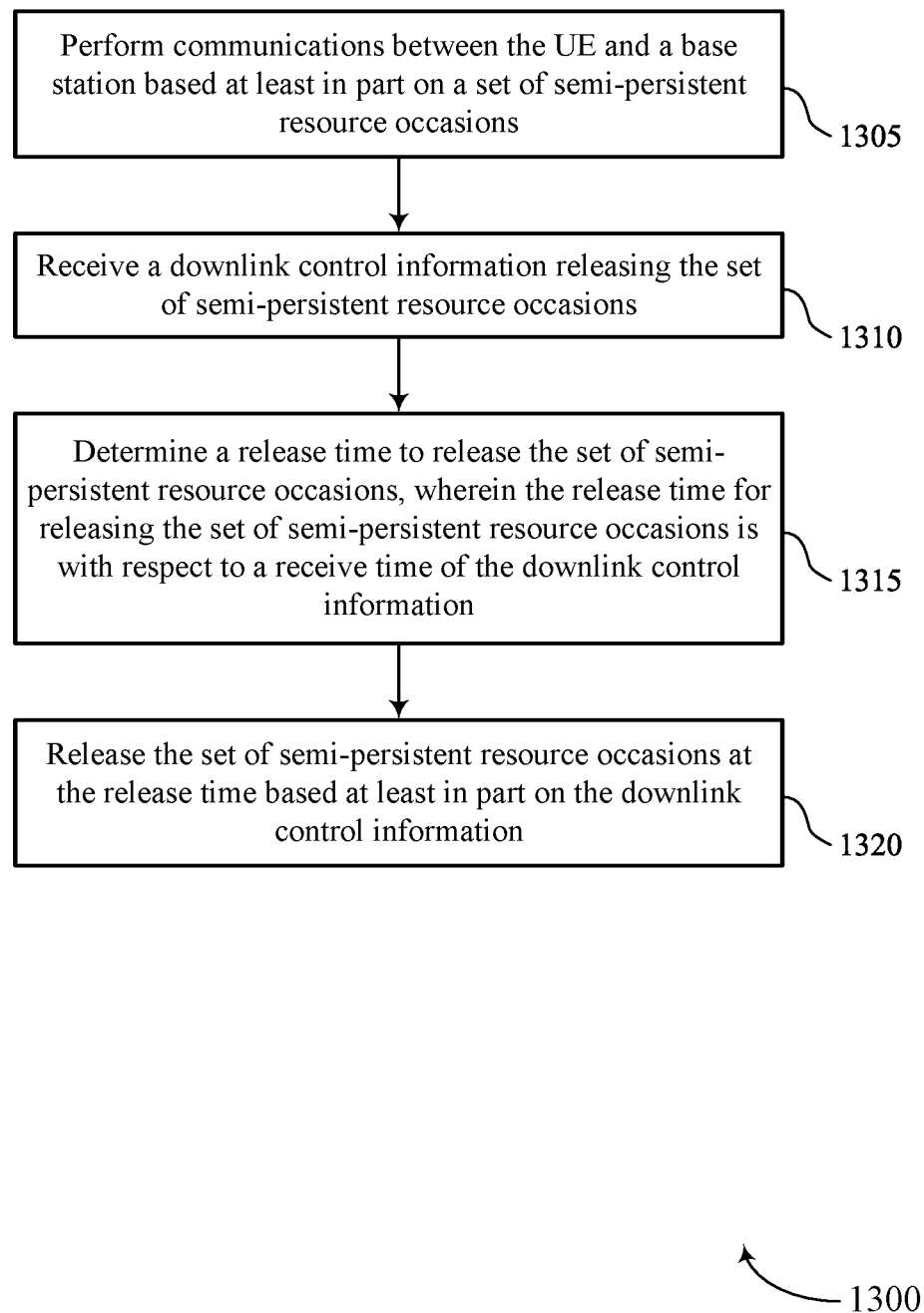
FIGS. 13 through 17 show flowcharts illustrating methods that support semi-persistent resource release timing signaling in accordance with aspects of the present disclosure.

FIG. 13 shows a flowchart illustrating a method 1300 that supports semi-persistent resource release timing signaling in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include performing communications between the UE and a base station based on a set of semi-persistent resource occasions. The operations of 1305 may be performed in accordance with examples as disclosed herein. In some examples, aspects of the operations of 1305 may be performed by a resource communication manager 725 as described with reference to FIG. 7.

At 1310, the method may include receiving a DCI releasing the set of semi-persistent resource occasions. The operations of 1310 may be performed in accordance with examples as disclosed herein. In some examples, aspects of the operations of 1310 may be performed by a releasing DCI manager 730 as described with reference to FIG. 7.

At 1315, the method may include determining a release time to release the set of semi-persistent resource occasions, where the release time for releasing the set of semi-persistent resource occasions is with respect to a receive time of the DCI. The operations of 1315 may be performed in accordance with examples as disclosed herein. In some examples, aspects of the operations of 1315 may be performed by a release timing manager 735 as described with reference to FIG. 7.

At 1320, the method may include releasing the set of semi-persistent resource occasions at the release time based on the DCI. The operations of 1320 may be performed in accordance with examples as disclosed herein. In some examples, aspects of the operations of 1320 may be performed by a release manager 740 as described with reference to FIG. 7.

Figure 14:
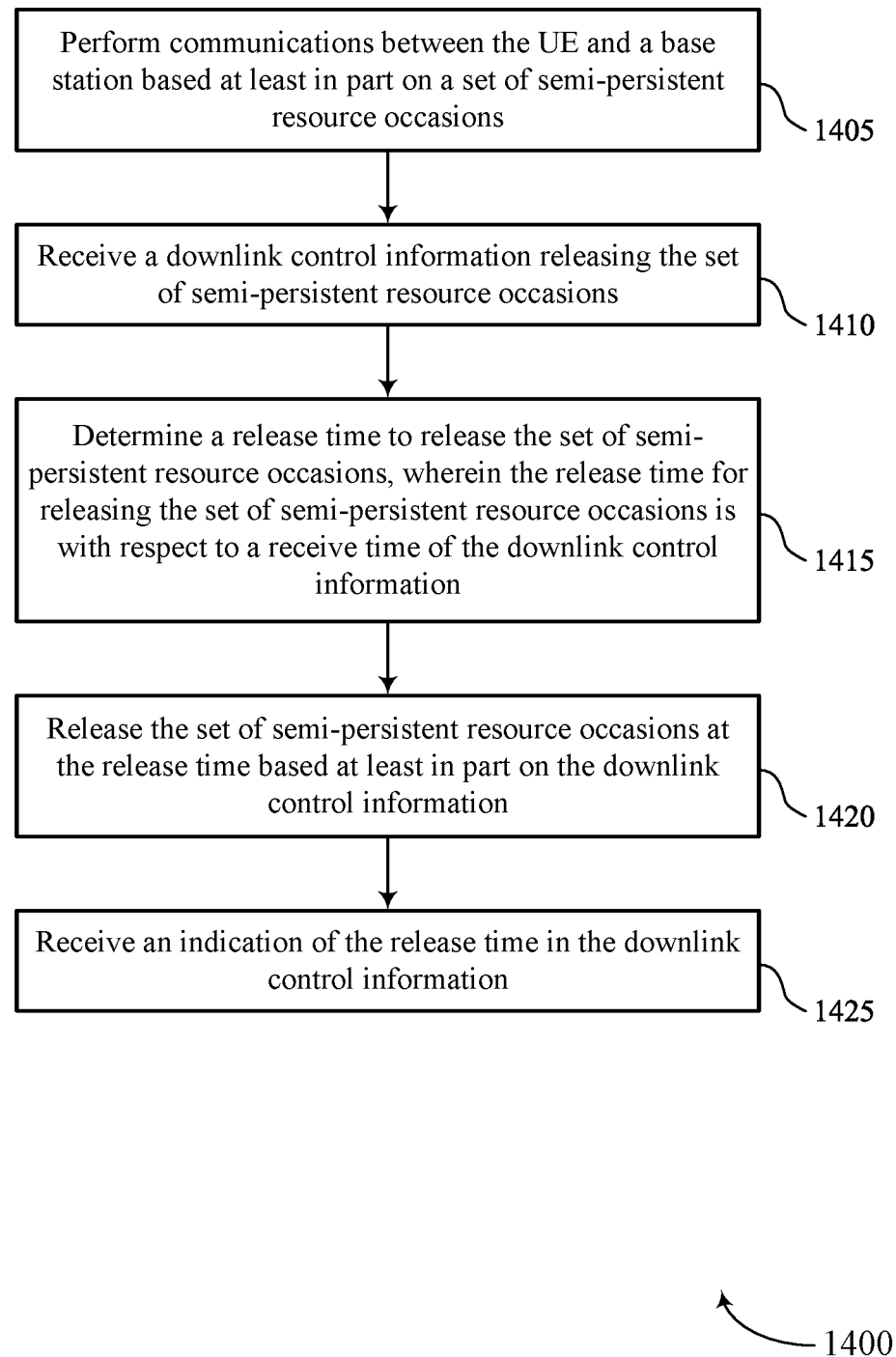

FIG. 14 shows a flowchart illustrating a method 1400 that supports semi-persistent resource release timing signaling in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include performing communications between the UE and a base station based on a set of semi-persistent resource occasions. The operations of 1405 may be performed in accordance with examples as disclosed herein. In some examples, aspects of the operations of 1405 may be performed by a resource communication manager 725 as described with reference to FIG. 7.

At 1410, the method may include receiving a DCI releasing the set of semi-persistent resource occasions. The operations of 1410 may be performed in accordance with examples as disclosed herein. In some examples, aspects of the operations of 1410 may be performed by a releasing DCI manager 730 as described with reference to FIG. 7.

At 1415, the method may include determining a release time to release the set of semi-persistent resource occasions, where the release time for releasing the set of semi-persistent resource occasions is with respect to a receive time of the DCI. The operations of 1415 may be performed in accordance with examples as disclosed herein. In some examples, aspects of the operations of 1415 may be performed by a release timing manager 735 as described with reference to FIG. 7.

At 1420, the method may include releasing the set of semi-persistent resource occasions at the release time based on the DCI. The operations of 1420 may be performed in accordance with examples as disclosed herein. In some examples, aspects of the operations of 1420 may be performed by a release manager 740 as described with reference to FIG. 7.

At 1425, the method may include receiving an indication of the release time in the DCI. The operations of 1425 may be performed in accordance with examples as disclosed herein. In some examples, aspects of the operations of 1425 may be performed by a release timing indication manager 745 as described with reference to FIG. 7.

Figure 15:
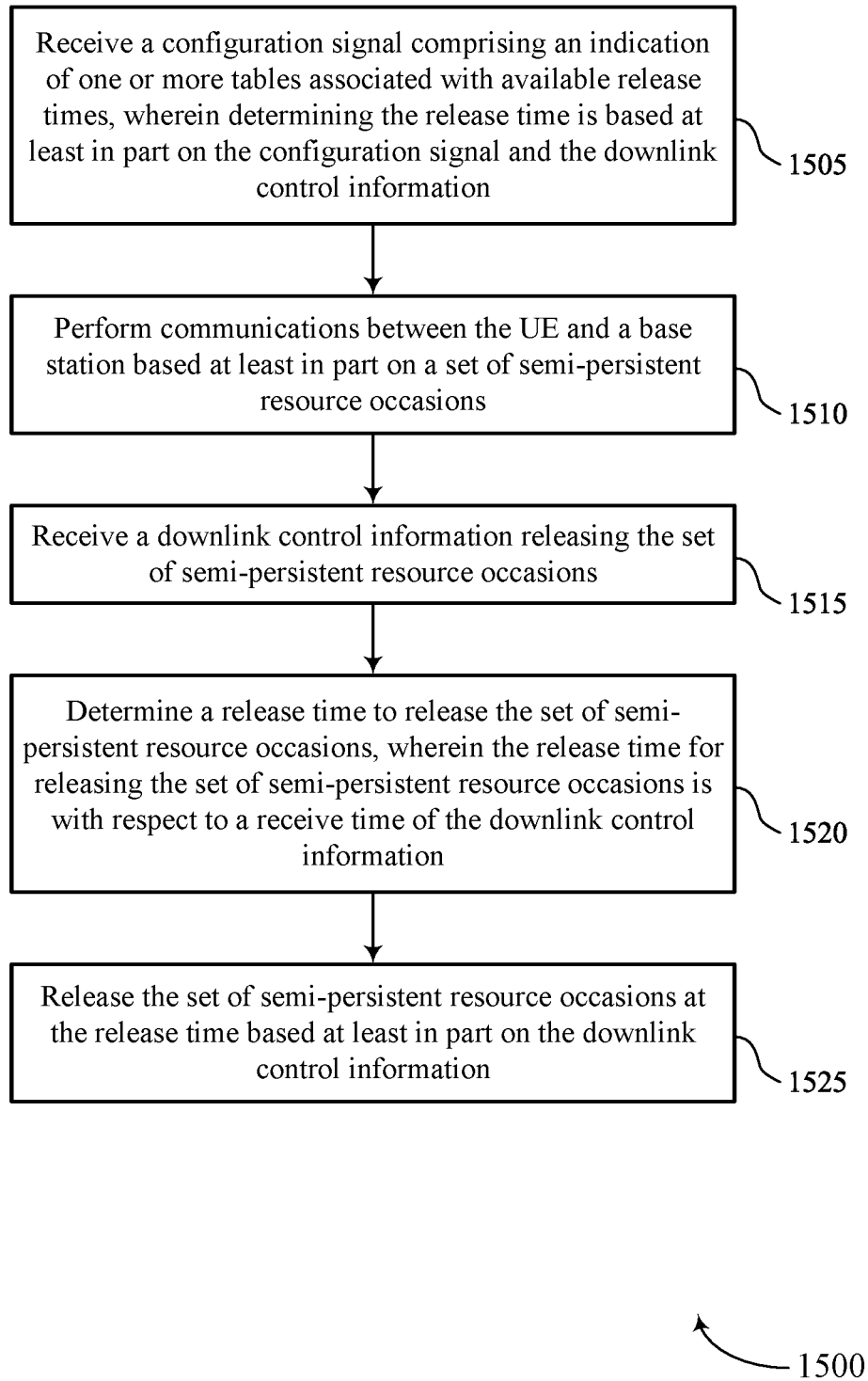

FIG. 15 shows a flowchart illustrating a method 1500 that supports semi-persistent resource release timing signaling in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a configuration signal including an indication of one or more tables associated with available release times, where determining the release time is based on the configuration signal and the DCI. The operations of 1505 may be performed in accordance with examples as disclosed herein. In some examples, aspects of the operations of 1505 may be performed by a release timing indication manager 745 as described with reference to FIG. 7.

At 1510, the method may include performing communications between the UE and a base station based on a set of semi-persistent resource occasions. The operations of 1510 may be performed in accordance with examples as disclosed herein. In some examples, aspects of the operations of 1510 may be performed by a resource communication manager 725 as described with reference to FIG. 7.

At 1515, the method may include receiving a DCI releasing the set of semi-persistent resource occasions. The operations of 1515 may be performed in accordance with examples as disclosed herein. In some examples, aspects of the operations of 1515 may be performed by a releasing DCI manager 730 as described with reference to FIG. 7.

At 1520, the method may include determining a release time to release the set of semi-persistent resource occasions, where the release time for releasing the set of semi-persistent resource occasions is with respect to a receive time of the DCI. The operations of 1520 may be performed in accordance with examples as disclosed herein. In some examples, aspects of the operations of 1520 may be performed by a release timing manager 735 as described with reference to FIG. 7.

At 1525, the method may include releasing the set of semi-persistent resource occasions at the release time based on the DCI. The operations of 1525 may be performed in accordance with examples as disclosed herein. In some examples, aspects of the operations of 1525 may be performed by a release manager 740 as described with reference to FIG. 7.

Figure 16:
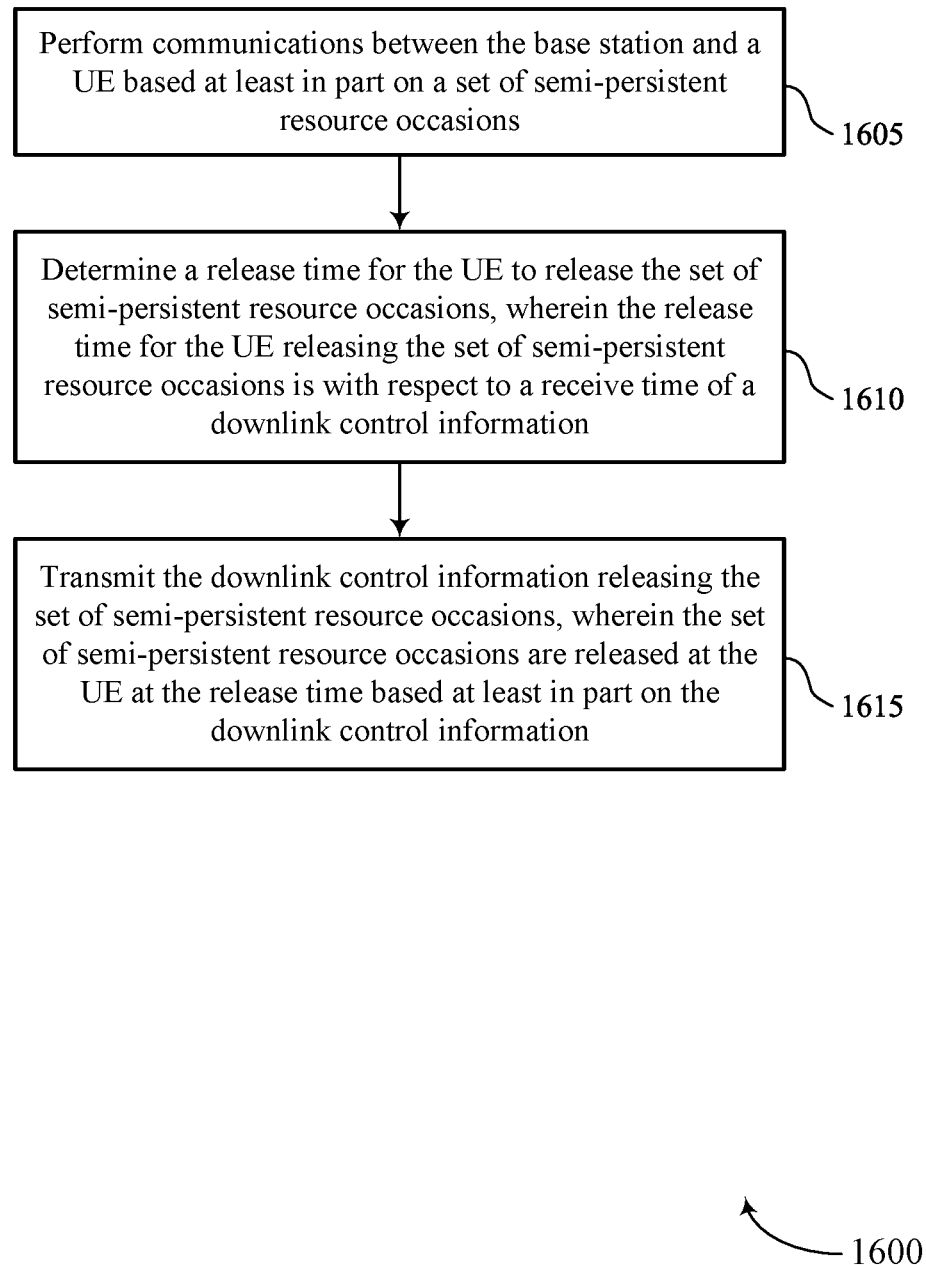

FIG. 16 shows a flowchart illustrating a method 1600 that supports semi-persistent resource release timing signaling in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include performing communications between the base station and a UE based on a set of semi-persistent resource occasions. The operations of 1605 may be performed in accordance with examples as disclosed herein. In some examples, aspects of the operations of 1605 may be performed by a resource communication manager 1125 as described with reference to FIG. 11.

At 1610, the method may include determining a release time for the UE to release the set of semi-persistent resource occasions, where the release time for the UE releasing the set of semi-persistent resource occasions is with respect to a receive time of a DCI. The operations of 1610 may be performed in accordance with examples as disclosed herein. In some examples, aspects of the operations of 1610 may be performed by a release time manager 1130 as described with reference to FIG. 11.

At 1615, the method may include transmitting the DCI releasing the set of semi-persistent resource occasions, where the set of semi-persistent resource occasions are released at the UE at the release time based on the DCI. The operations of 1615 may be performed in accordance with examples as disclosed herein. In some examples, aspects of the operations of 1615 may be performed by a releasing DCI manager 1135 as described with reference to FIG. 11.

Figure 17:
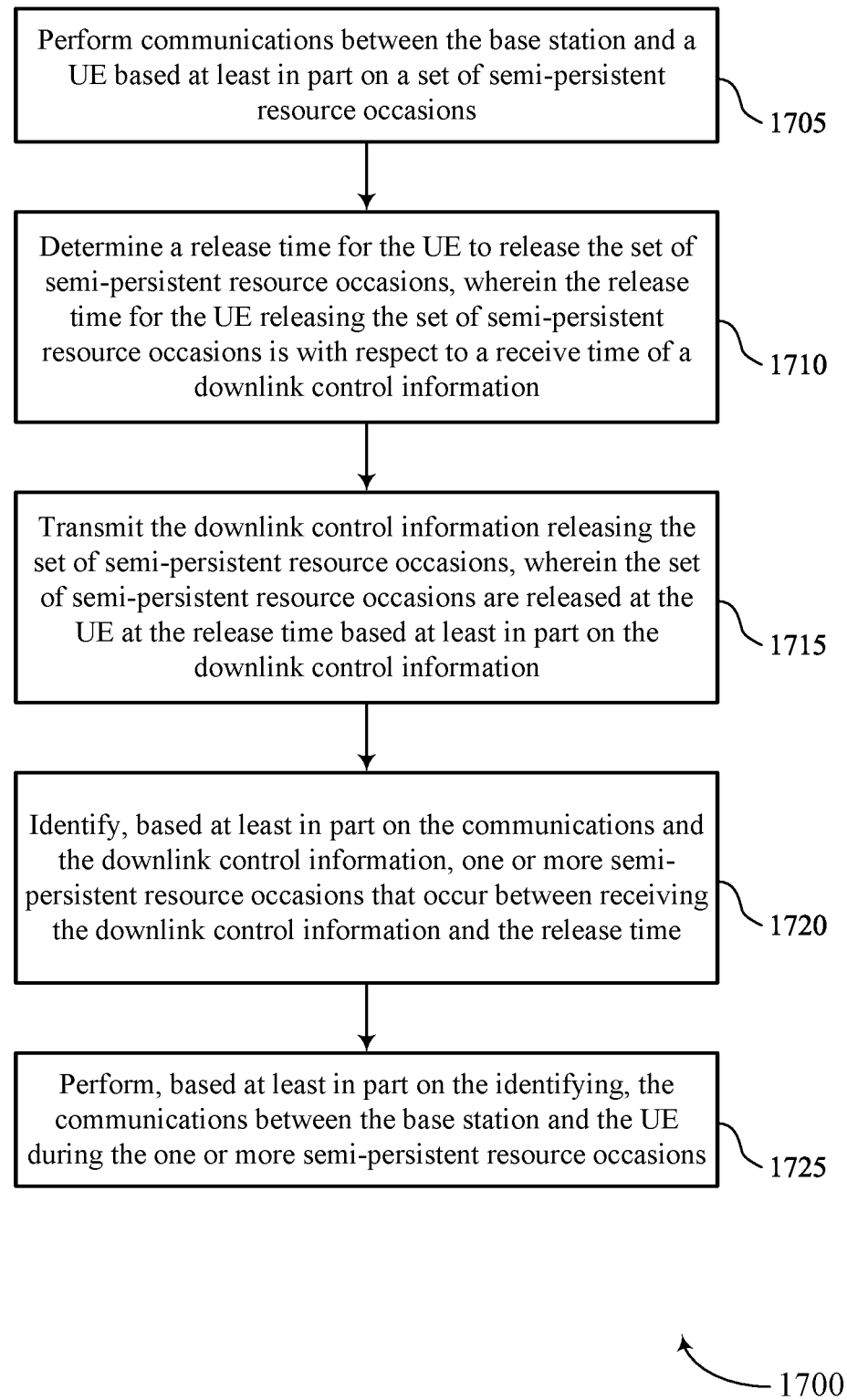

FIG. 17 shows a flowchart illustrating a method 1700 that supports semi-persistent resource release timing signaling in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1705, the method may include performing communications between the base station and a UE based on a set of semi-persistent resource occasions. The operations of 1705 may be performed in accordance with examples as disclosed herein. In some examples, aspects of the operations of 1705 may be performed by a resource communication manager 1125 as described with reference to FIG. 11.

At 1710, the method may include determining a release time for the UE to release the set of semi-persistent resource occasions, where the release time for the UE releasing the set of semi-persistent resource occasions is with respect to a receive time of a DCI. The operations of 1710 may be performed in accordance with examples as disclosed herein. In some examples, aspects of the operations of 1710 may be performed by a release time manager 1130 as described with reference to FIG. 11.

At 1715, the method may include transmitting the DCI releasing the set of semi-persistent resource occasions, where the set of semi-persistent resource occasions are released at the UE at the release time based on the DCI. The operations of 1715 may be performed in accordance with examples as disclosed herein. In some examples, aspects of the operations of 1715 may be performed by a releasing DCI manager 1135 as described with reference to FIG. 11.

At 1720, the method may include identifying, based on the communications and the DCI, one or more semi-persistent resource occasions that occur between receiving the DCI and the release time. The operations of 1720 may be performed in accordance with examples as disclosed herein. In some examples, aspects of the operations of 1720 may be performed by a resource usage manager 1145 as described with reference to FIG. 11.

At 1725, the method may include performing, based on the identifying, the communications between the base station and the UE during the one or more semi-persistent resource occasions. The operations of 1725 may be performed in accordance with examples as disclosed herein. In some examples, aspects of the operations of 1725 may be performed by a resource usage manager 1145 as described with reference to FIG. 11.

The following provides an overview of aspects of the present disclosure:

Aspect 1: A method for wireless communication at a UE, comprising: performing communications between the UE and a base station based at least in part on a set of semi-persistent resource occasions; receiving a downlink control information releasing the set of semi-persistent resource occasions; determining a release time to release the set of semi-persistent resource occasions, wherein the release time for releasing the set of semi-persistent resource occasions is with respect to a receive time of the downlink control information; and releasing the set of semi-persistent resource occasions at the release time based at least in part on the downlink control information.

Aspect 2: The method of aspect 1, wherein determining the release time comprises: receiving an indication of the release time in the downlink control information.

Aspect 3: The method of any of aspects 1 through 2, further comprising: receiving a configuration signal comprising an indication of one or more tables associated with available release times, wherein determining the release time is based at least in part on the configuration signal and the downlink control information.

Aspect 4: The method of aspect 3, wherein the configuration signal comprises at least one of a first RRC configuration signal configuring the set of semi-persistent resource occasions, a second RRC configuration signal separate from the first RRC configuration signal, a MAC CE, or a combination thereof.

Aspect 5: The method of any of aspects 1 through 4, further comprising: identifying, based at least in part on the communications and the downlink control information, one or more semi-persistent resource occasions that occur between receiving the downlink control information and the release time; and performing, based at least in part on the identifying, the communications between the UE and the base station during the one or more semi-persistent resource occasions.

Aspect 6: The method of any of aspects 1 through 5, further comprising: identifying, based at least in part on the communications and the downlink control information, one or more semi-persistent resource occasions that begin before the release time and end after the release time; and performing, based at least in part on the identifying, the communications between the UE and the base station during the one or more semi-persistent resource occasions.

Aspect 7: The method of aspect 6, wherein performing the communications comprises: transmitting a feedback message associated with the communications between the UE and the base station during the one or more semi-persistent resource occasions and based at least in part on the release time, the feedback message indicating acknowledgement information for the one or more semi-persistent resource occasions.

Aspect 8: The method of any of aspects 1 through 5, further comprising: identifying, based at least in part on the communications and the downlink control information, one or more semi-persistent resource occasions that begin before the release time and end after the release time; and refraining from performing, based at least in part on the identifying, the communications between the UE and the base station during the one or more semi-persistent resource occasions.

Aspect 9: The method of aspect 8, wherein refraining from performing the communications comprises: discarding communications performed during the one or more semi-persistent resource occasions; and refraining from transmitting a feedback message associated with the discarded communications between the UE and the base station during the one or more semi-persistent resource occasions and based at least in part on the release time, the feedback message indicating acknowledgement information for the one or more semi-persistent resource occasions.

Aspect 10: The method of any of aspects 1 through 9, further comprising: identifying, based at least in part on the communications and the downlink control information, one or more semi-persistent resource occasions that begin at or after the release time; and refraining from performing, based at least in part on the identifying, the communications between the UE and the base station during the one or more semi-persistent resource occasions.

Aspect 11: The method of any of aspects 1 through 10, further comprising: transmitting a feedback message associated with the communications between the UE and the base station based at least in part on the release time, the feedback message indicating acknowledgement information for one or more semi-persistent resource occasions of the set of semi-persistent resource occasions that are selected based at least in part on the release time and the downlink control information.

Aspect 12: The method of any of aspects 1 through 11, wherein determining the release time comprises: determining a last symbol associated with the downlink control information; and determining the release time based at least in part on the last symbol associated with the downlink control information and the downlink control information.

Aspect 13: The method of any of aspects 1 through 12, further comprising: transmitting a UE capability message indicating a UE processing time associated with the UE processing the downlink control information, wherein the release time is based at least in part on the UE processing time.

Aspect 14: The method of any of aspects 1 through 13, wherein the release time is based on at least one of a symbol offset, a mini-slot offset, a slot offset, or a combination thereof, between the downlink control information and the release time.

Aspect 15: The method of any of aspects 1 through 14, wherein the set of semi-persistent resource occasions comprise downlink SPS resource occasions, uplink CG resource occasions, or both.

Aspect 16: A method for wireless communication at a base station, comprising: performing communications between the base station and a UE based at least in part on a set of semi-persistent resource occasions; determining a release time for the UE to release the set of semi-persistent resource occasions, wherein the release time for the UE releasing the set of semi-persistent resource occasions is with respect to a receive time of a downlink control information; and transmitting the downlink control information releasing the set of semi-persistent resource occasions, wherein the set of semi-persistent resource occasions are released at the UE at the release time based at least in part on the downlink control information.

Aspect 17: The method of aspect 16, further comprising: transmitting an indication of the release time in the downlink control information.

Aspect 18: The method of any of aspects 16 through 17, further comprising: transmitting a configuration signal comprising an indication of one or more tables associated with available release times, wherein the release time is based at least in part on the configuration signal and the downlink control information.

Aspect 19: The method of aspect 18, wherein the configuration signal comprises at least one of a first RRC configuration signal configuring the set of semi-persistent resource occasions, a second RRC configuration signal separate from the first RRC configuration signal, a MAC CE, or a combination thereof.

Aspect 20: The method of any of aspects 16 through 19, further comprising: identifying, based at least in part on the communications and the downlink control information, one or more semi-persistent resource occasions that occur between receiving the downlink control information and the release time; and performing, based at least in part on the identifying, the communications between the base station and the UE during the one or more semi-persistent resource occasions.

Aspect 21: The method of any of aspects 16 through 20, further comprising: identifying, based at least in part on the communications and the downlink control information, one or more semi-persistent resource occasions that begin before the release time and end after the release time; and performing, based at least in part on the identifying, the communications between the base station and the UE during the one or more semi-persistent resource occasions.

Aspect 22: The method of aspect 21, wherein performing the communications comprises: receiving a feedback message associated with the communications between the base station and the UE during the one or more semi-persistent resource occasions and based at least in part on the release time, the feedback message indicating acknowledgement information for the one or more semi-persistent resource occasions.

Aspect 23: The method of any of aspects 16 through 20, further comprising: identifying, based at least in part on the communications and the downlink control information, one or more semi-persistent resource occasions that begin before the release time and end after the release time; and refraining from performing, based at least in part on the identifying, the communications between the base station and the UE during the one or more semi-persistent resource occasions.

Aspect 24: The method of aspect 23, wherein refraining from performing the communications comprises: refraining from receiving a feedback message associated with a discarded communications between the UE and the base station during the one or more semi-persistent resource occasions and based at least in part on the release time, the feedback message indicating acknowledgement information for the one or more semi-persistent resource occasions.

Aspect 25: The method of any of aspects 16 through 24, further comprising: identifying, based at least in part on the communications and the downlink control information, one or more semi-persistent resource occasions that begin at or after the release time; and refraining from performing, based at least in part on the identifying, the communications between the base station and the UE during the one or more semi-persistent resource occasions.

Aspect 26: The method of any of aspects 16 through 25, further comprising: receiving a feedback message associated with the communications between the base station and the UE based at least in part on the release time, the feedback message indicating acknowledgement information for one or more semi-persistent resource occasions of the set of semi-persistent resource occasions that are selected based at least in part on the release time and the downlink control information.

Aspect 27: The method of any of aspects 16 through 26, wherein determining the release time comprises: determining a last symbol associated with the downlink control information; and determining the release time based at least in part on the last symbol associated with the downlink control information and the downlink control information.

Aspect 28: The method of any of aspects 16 through 27, further comprising: receiving a UE capability message indicating a UE processing time associated with the UE processing the downlink control information, wherein the release time is based at least in part on the UE processing time.

Aspect 29: The method of any of aspects 16 through 28, wherein the release time is based on at least one of a symbol offset, a mini-slot offset, a slot offset, or a combination thereof, between the downlink control information and the release time.

Aspect 30: The method of any of aspects 16 through 29, wherein the set of semi-persistent resource occasions comprise downlink SPS resource occasions, uplink CG resource occasions, or both.

Aspect 31: An apparatus for wireless communication at a UE, comprising a processor; memory coupled with the processor; and instructions stored in the memory and executable by the processor to cause the apparatus to perform a method of any of aspects 1 through 15.

Aspect 32: An apparatus for wireless communication at a UE, comprising at least one means for performing a method of any of aspects 1 through 15.

Aspect 33: A non-transitory computer-readable medium storing code for wireless communication at a UE, the code comprising instructions executable by a processor to perform a method of any of aspects 1 through 15.

Aspect 34: An apparatus for wireless communication at a base station, comprising a processor; memory coupled with the processor; and instructions stored in the memory and executable by the processor to cause the apparatus to perform a method of any of aspects 16 through 30.

Aspect 35: An apparatus for wireless communication at a base station, comprising at least one means for performing a method of any of aspects 16 through 30.

Aspect 36: A non-transitory computer-readable medium storing code for wireless communication at a base station, the code comprising instructions executable by a processor to perform a method of any of aspects 16 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
      perform communications between the UE and a network device based at least in part on a set of semi-persistent resource occasions;
      receive a downlink control information comprising an indication to release the set of semi-persistent resource occasions and comprising an indication of a time offset value between a last symbol of the downlink control information and a release time for releasing the set of semi-persistent resource occasions;
      determine the release time to release the set of semi-persistent resource occasions based at least in part on the time offset value and the last symbol of the downlink control information; and
      release the set of semi-persistent resource occasions at the release time based at least in part on the indication of the time offset value in the downlink control information.

2. The apparatus of claim 1, wherein the instructions are further executable by the one or more processors to cause the apparatus to:
   receive a configuration signal comprising an indication of one or more tables associated with available time offset values including the time offset value, wherein determining the release time is based at least in part on the configuration signal and the downlink control information.

3. The apparatus of claim 2, wherein the configuration signal comprises at least one of a first radio resource control (RRC) configuration signal configuring the set of semi-persistent resource occasions, a second RRC configuration signal separate from the first RRC configuration signal, a medium access control (MAC) control element (CE), or a combination thereof.

4. The apparatus of claim 1, wherein the instructions are further executable by the one or more processors to cause the apparatus to:
   identify, based at least in part on the communications and the downlink control information, one or more semi-persistent resource occasions that occur between receiving the downlink control information and the release time; and
   perform, based at least in part on the identifying, the communications between the UE and the network device during the one or more semi-persistent resource occasions.

5. The apparatus of claim 1, wherein the instructions are further executable by the one or more processors to cause the apparatus to:
   identify, based at least in part on the communications and the downlink control information, one or more semi-persistent resource occasions that begin before the release time and end after the release time; and
   perform, based at least in part on the identifying, the communications between the UE and the network device during the one or more semi-persistent resource occasions.

6. The apparatus of claim 5, wherein the instructions to perform the communications are executable by the one or more processors to cause the apparatus to:
   transmit a feedback message associated with the communications between the UE and the network device during the one or more semi-persistent resource occasions and based at least in part on the release time, the feedback message indicating acknowledgement information for the one or more semi-persistent resource occasions.

7. The apparatus of claim 1, wherein the instructions are further executable by the one or more processors to cause the apparatus to:
   identify, based at least in part on the communications and the downlink control information, one or more semi-persistent resource occasions that begin before the release time and end after the release time; and
   refrain from performing, based at least in part on the identifying, the communications between the UE and the network device during the one or more semi-persistent resource occasions.

8. The apparatus of claim 7, wherein the instructions to refrain from performing the communications are executable by the one or more processors to cause the apparatus to:
   discard communications performed during the one or more semi-persistent resource occasions; and
   refrain from transmitting a feedback message associated with the discarded communications between the UE and the network device during the one or more semi-persistent resource occasions and based at least in part on the release time, the feedback message indicating acknowledgement information for the one or more semi-persistent resource occasions.

9. The apparatus of claim 1, wherein the instructions are further executable by the one or more processors to cause the apparatus to:
   identify, based at least in part on the communications and the downlink control information, one or more semi-persistent resource occasions that begin at or after the release time; and
   refrain from performing, based at least in part on the identifying, the communications between the UE and the network device during the one or more semi-persistent resource occasions.

10. The apparatus of claim 1, wherein the instructions are further executable by the one or more processors to cause the apparatus to:

transmit a feedback message associated with the communications between the UE and the network device based at least in part on the release time, the feedback message indicating acknowledgement information for one or more semi-persistent resource occasions of the set of semi-persistent resource occasions that are selected based at least in part on the release time and the downlink control information.

11. The apparatus of claim 1, wherein the instructions are further executable by the one or more processors to cause the apparatus to:
transmit a UE capability message indicating a UE processing time associated with the UE processing the downlink control information, wherein the time offset value is based at least in part on the UE processing time.

12. The apparatus of claim 1, wherein the time offset value comprises at least one of a symbol offset, a mini-slot offset, a slot offset, or a combination thereof, after the last symbol of the downlink control information.

13. The apparatus of claim 1, wherein the set of semi-persistent resource occasions comprise downlink semi-persistent scheduling (SPS) resource occasions, uplink configured grant (CG) resource occasions, or both.

14. The apparatus of claim 1, wherein the time offset value is greater than or equal to a default processing time, and wherein the default processing time corresponds to a quantity of time for the UE to receive, process, and respond to the downlink control information.

15. An apparatus for wireless communication at a network device, comprising:
one or more processors;
one or more memories coupled with the one or more processors; and
instructions stored in the one or more memories and executable by the one or more processors to cause the apparatus to:
perform communications between the network device and a user equipment (UE) based at least in part on a set of semi-persistent resource occasions;
determine a release time for the UE to release the set of semi-persistent resource occasions based at least in part on a time offset value and a last symbol of a downlink control information; and
transmit the downlink control information comprising an indication to release the set of semi-persistent resource occasions and comprising an indication of the time offset value, wherein the set of semi-persistent resource occasions are released at the UE at the release time according to the time offset value in the downlink control information and the last symbol of the downlink control information.

16. The apparatus of claim 15, wherein the instructions are further executable by the one or more processors to cause the apparatus to:
transmit a configuration signal comprising an indication of one or more tables associated with available time offset values including the time offset value, wherein the release time is based at least in part on the configuration signal and the downlink control information.

17. The apparatus of claim 16, wherein the configuration signal comprises at least one of a first radio resource control (RRC) configuration signal configuring the set of semi-persistent resource occasions, a second RRC configuration signal separate from the first RRC configuration signal, a medium access control (MAC) control element (CE), or a combination thereof.

18. The apparatus of claim 15, wherein the instructions are further executable by the one or more processors to cause the apparatus to:
identify, based at least in part on the communications and the downlink control information, one or more semi-persistent resource occasions that occur between receiving the downlink control information and the release time; and
perform, based at least in part on the identifying, the communications between the network device and the UE during the one or more semi-persistent resource occasions.

19. The apparatus of claim 15, wherein the instructions are further executable by the one or more processors to cause the apparatus to:
identify, based at least in part on the communications and the downlink control information, one or more semi-persistent resource occasions that begin before the release time and end after the release time; and
perform, based at least in part on the identifying, the communications between the network device and the UE during the one or more semi-persistent resource occasions.

20. The apparatus of claim 19, wherein the instructions to perform the communications are executable by the one or more processors to cause the apparatus to:
receive a feedback message associated with the communications between the network device and the UE during the one or more semi-persistent resource occasions and based at least in part on the release time, the feedback message indicating acknowledgement information for the one or more semi-persistent resource occasions.

21. The apparatus of claim 15, wherein the instructions are further executable by the one or more processors to cause the apparatus to:
identify, based at least in part on the communications and the downlink control information, one or more semi-persistent resource occasions that begin before the release time and end after the release time; and
refrain from performing, based at least in part on the identifying, the communications between the network device and the UE during the one or more semi-persistent resource occasions.

22. The apparatus of claim 21, wherein the instructions to refrain from performing the communications are executable by the one or more processors to cause the apparatus to:
refrain from receiving a feedback message associated with a discarded communications between the UE and the network device during the one or more semi-persistent resource occasions and based at least in part on the release time, the feedback message indicating acknowledgement information for the one or more semi-persistent resource occasions.

23. The apparatus of claim 15, wherein the instructions are further executable by the one or more processors to cause the apparatus to:
identify, based at least in part on the communications and the downlink control information, one or more semi-persistent resource occasions that begin at or after the release time; and
refrain from performing, based at least in part on the identifying, the communications between the network device and the UE during the one or more semi-persistent resource occasions.

24. The apparatus of claim 15, wherein the instructions are further executable by the one or more processors to cause the apparatus to:
receive a feedback message associated with the communications between the network device and the UE based at least in part on the release time, the feedback message indicating acknowledgement information for one or more semi-persistent resource occasions of the set of semi-persistent resource occasions that are selected based at least in part on the release time and the downlink control information.

25. The apparatus of claim 15, wherein the instructions are further executable by the one or more processors to cause the apparatus to:
receive a UE capability message indicating a UE processing time associated with the UE processing the downlink control information, wherein the time offset value is based at least in part on the UE processing time.

26. The apparatus of claim 15, wherein the time offset value is greater than or equal to a default processing time, and wherein the default processing time corresponds to a quantity of time for the UE to receive, process, and respond to the downlink control information.

27. A method for wireless communication at a user equipment (UE), comprising:
performing communications between the UE and a network device based at least in part on a set of semi-persistent resource occasions;
receiving a downlink control information comprising an indication to release the set of semi-persistent resource occasions and comprising an indication of a time offset value between a last symbol of the downlink control information and a release time for releasing the set of semi-persistent resource occasions;
determining the release time to release the set of semi-persistent resource occasions based at least in part on the time offset value and the last symbol of the downlink control information; and
releasing the set of semi-persistent resource occasions at the release time based at least in part on the indication of the time offset value in the downlink control information.

28. The method of claim 27, wherein the time offset value is greater than or equal to a default processing time, and wherein the default processing time corresponds to a quantity of time for the UE to receive, process, and respond to the downlink control information.

29. A method for wireless communication at a network device, comprising:
performing communications between the network device and a user equipment (UE) based at least in part on a set of semi-persistent resource occasions;
determining a release time for the UE to release the set of semi-persistent resource occasions based at least in part on a time offset value and a last symbol of downlink control information; and
transmitting the downlink control information comprising an indication to release the set of semi-persistent resource occasions and comprising an indication of the time offset value, wherein the set of semi-persistent resource occasions are released at the UE at the release time based at least in part on the indication of the time offset value in the downlink control information and on the last symbol of the downlink control information.

30. The method of claim 29, wherein the time offset value is greater than or equal to a default processing time, and wherein the default processing time corresponds to a quantity of time for the UE to receive, process, and respond to the downlink control information.

* * * * *